US009154900B1

(12) United States Patent
Addepalli et al.

(10) Patent No.: US 9,154,900 B1
(45) Date of Patent: Oct. 6, 2015

(54) SYSTEM AND METHOD FOR TRANSPORT, NETWORK, TRANSLATION, AND ADAPTIVE CODING IN A VEHICULAR NETWORK ENVIRONMENT

(75) Inventors: Sateesh K. Addepalli, San Jose, CA (US); Preethi Natarajan, Los Gatos, CA (US); Raghuram S. Sudhaakar, Sunnyvale, CA (US); Lillian Lei Dai, Rockville, MD (US); Vina Ermagan, San Jose, CA (US); Christian Ibars Casas, Celra (ES); Pere Monclus, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 180 days.

(21) Appl. No.: 13/114,659

(22) Filed: May 24, 2011

Related U.S. Application Data

(60) Provisional application No. 61/433,138, filed on Jan. 14, 2011.

(51) Int. Cl.
*H04W 4/00* (2009.01)
*H04L 29/06* (2006.01)
*H04W 4/10* (2009.01)
(Continued)

(52) U.S. Cl.
CPC ............... *H04W 4/00* (2013.01); *H04L 1/008* (2013.01); *H04L 69/18* (2013.01); *H04W 4/10* (2013.01); *H04W 12/02* (2013.01); *H04W 12/04* (2013.01); *H04W 28/06* (2013.01); *H04W 76/005* (2013.01); *H04W 80/02* (2013.01)

(58) Field of Classification Search
CPC ....... H04L 1/008; H04L 69/18; H04L 9/0819; H04W 48/18; H04W 48/06; H04W 4/046; H04W 12/08; H04W 50/10; H04W 12/02; H04W 12/04; H04W 28/06; H04W 80/02; H04W 4/10; H04W 76/005
USPC .................................................. 370/328–332
See application file for complete search history.

(56) References Cited

U.S. PATENT DOCUMENTS 5,428,666 A   6/1995 Fyfe et al.
5,604,787 A   2/1997 Kotzin et al.
(Continued)

FOREIGN PATENT DOCUMENTS

DE   10146664 A1   2/2003
EP   1337119 A    8/2003
(Continued)

OTHER PUBLICATIONS

U.S. Appl. No. 13/071,367, entitled "System and Method for Wireless Interface Selection and for Communication and Access Control of Subsystems, Devices, and Data in a Vehicular Environment," filed Mar. 24, 2011, Inventors: Sateesh K. Addepalli et al.
(Continued)

*Primary Examiner* — Jae Y Lee
*Assistant Examiner* — Jean F Voltaire
(74) *Attorney, Agent, or Firm* — Patent Capital Group

(57) ABSTRACT

In accordance with one embodiment, a system and method are provided for translation services to facilitate interoperation between mobility schemes. In other embodiments, the system and method may provide transport and network services for legacy applications, and adaptive coding for message, packet, link and physical layers.

20 Claims, 8 Drawing Sheets

(51) Int. Cl.
*H04L 1/00* (2006.01)
*H04W 80/02* (2009.01)
*H04W 12/04* (2009.01)
*H04W 12/02* (2009.01)
*H04W 28/06* (2009.01)
*H04W 76/00* (2009.01)

(56) References Cited

U.S. PATENT DOCUMENTS

| | | |
|---|---|---|
| 5,737,215 A | 4/1998 | Schricker et al. |
| 5,763,862 A | 6/1998 | Jachimowicz et al. |
| 5,933,773 A | 8/1999 | Barvesten |
| 5,987,325 A | 11/1999 | Tayloe |
| 6,002,929 A | 12/1999 | Bishop et al. |
| 6,078,652 A | 6/2000 | Barak |
| 6,169,387 B1 | 1/2001 | Kaib |
| 6,175,789 B1 | 1/2001 | Beckert et al. |
| 6,285,869 B1 | 9/2001 | Shannon et al. |
| 6,320,351 B1 | 11/2001 | Ng et al. |
| 6,427,072 B1 | 7/2002 | Reichelt |
| 6,427,073 B1 | 7/2002 | Kortesalmi et al. |
| 6,484,082 B1 | 11/2002 | Millsap et al. |
| 6,490,679 B1 | 12/2002 | Tumblin et al. |
| 6,516,357 B1 | 2/2003 | Hamann et al. |
| 6,526,272 B1 | 2/2003 | Bansal et al. |
| 6,574,734 B1 | 6/2003 | Colson et al. |
| 6,587,127 B1 | 7/2003 | Leeke et al. |
| 6,604,140 B1 | 8/2003 | Beck et al. |
| 6,643,504 B1 | 11/2003 | Chow et al. |
| 6,668,179 B2 | 12/2003 | Jiang |
| 6,714,799 B1 | 3/2004 | Park et al. |
| 6,721,580 B1 | 4/2004 | Moon |
| 6,735,506 B2 | 5/2004 | Breed et al. |
| 6,757,262 B1 | 6/2004 | Weisshaar et al. |
| 6,823,244 B2 | 11/2004 | Breed |
| 6,868,282 B2 | 3/2005 | Carlsson |
| 6,914,517 B2 | 7/2005 | Kinsella |
| 6,925,425 B2 | 8/2005 | Remboski et al. |
| 6,928,299 B1 | 8/2005 | Rinne et al. |
| 6,934,391 B1 | 8/2005 | Linkola et al. |
| 6,957,199 B1 | 10/2005 | Fisher |
| 6,980,830 B2 | 12/2005 | Ahonen |
| 7,039,221 B1 | 5/2006 | Tumey et al. |
| 7,050,897 B2 | 5/2006 | Breed et al. |
| 7,064,711 B2 | 6/2006 | Strickland et al. |
| 7,069,144 B2 | 6/2006 | Yoshihara et al. |
| 7,082,359 B2 | 7/2006 | Breed |
| 7,096,316 B1 | 8/2006 | Karr et al. |
| 7,171,460 B2 | 1/2007 | Kalavade et al. |
| 7,178,724 B2 | 2/2007 | Tamagno et al. |
| 7,185,161 B2 | 2/2007 | Kang |
| 7,218,930 B2 | 5/2007 | Ko et al. |
| 7,222,783 B2 | 5/2007 | Merrien |
| 7,259,469 B2 | 8/2007 | Brummet et al. |
| 7,363,056 B2 | 4/2008 | Faisy |
| 7,389,178 B2 | 6/2008 | Raz et al. |
| 7,412,313 B2 | 8/2008 | Isaac |
| 7,412,380 B1 | 8/2008 | Avendano et al. |
| 7,558,110 B2 | 7/2009 | Mizushima et al. |
| 7,564,842 B2 | 7/2009 | Callaway et al. |
| 7,593,605 B2 | 9/2009 | King et al. |
| 7,603,107 B2 | 10/2009 | Ratert et al. |
| 7,606,643 B2 | 10/2009 | Hunt et al. |
| 7,630,802 B2 | 12/2009 | Breed |
| 7,631,033 B2 | 12/2009 | Zehler |
| 7,636,626 B2 | 12/2009 | Oesterling et al. |
| 7,689,231 B2 | 3/2010 | Mardiks et al. |
| 7,689,251 B2 | 3/2010 | Bae |
| 7,729,725 B2 | 6/2010 | Stenmark |
| 7,738,891 B2 | 6/2010 | Tenhunen et al. |
| 7,755,472 B2 | 7/2010 | Grossman |
| 7,778,227 B2 | 8/2010 | Gibbs |
| 7,787,602 B2 | 8/2010 | Pearson et al. |
| 7,791,310 B2 | 9/2010 | Luz et al. |
| 7,792,618 B2 | 9/2010 | Quigley et al. |
| 7,808,375 B2 | 10/2010 | Bertness et al. |
| 7,844,817 B2 | 11/2010 | Mueller et al. |
| 7,849,020 B2 | 12/2010 | Johnson |
| 7,904,569 B1 | 3/2011 | Gelvin et al. |
| 7,917,251 B2 | 3/2011 | Kressner et al. |
| 7,957,729 B2 | 6/2011 | Roter et al. |
| 7,957,744 B2 | 6/2011 | Oesterling et al. |
| 8,054,038 B2 | 11/2011 | Kelty et al. |
| 8,061,140 B2 | 11/2011 | Harmon |
| 8,063,797 B1 | 11/2011 | Sonnabend et al. |
| 8,081,643 B2 | 12/2011 | Sonoda et al. |
| 8,086,395 B2 | 12/2011 | Mino |
| 8,095,184 B2 | 1/2012 | Hiltunen et al. |
| 8,100,206 B2 | 1/2012 | Kressner et al. |
| 8,131,317 B2 | 3/2012 | Lee |
| 8,135,443 B2 | 3/2012 | Aleksic et al. |
| 8,140,064 B2 | 3/2012 | Mardiks |
| 8,143,741 B2 | 3/2012 | Funakoshi et al. |
| 8,144,596 B2 | 3/2012 | Veillette |
| 8,180,400 B2 | 5/2012 | Shin et al. |
| 8,185,300 B2 | 5/2012 | Miura et al. |
| 8,195,233 B2 | 6/2012 | Morikuni et al. |
| 8,195,235 B2 | 6/2012 | Montes |
| 8,207,642 B2 | 6/2012 | Lafontaine et al. |
| 8,233,389 B2 | 7/2012 | Yim et al. |
| 8,244,468 B2 | 8/2012 | Scalisi et al. |
| 8,244,909 B1 | 8/2012 | Hanson et al. |
| 8,249,087 B2 | 8/2012 | Takada et al. |
| 8,255,107 B2 | 8/2012 | Yang et al. |
| 8,294,420 B2 | 10/2012 | Kocher |
| 8,296,373 B2 | 10/2012 | Bosworth et al. |
| 8,335,493 B2 | 12/2012 | Angelhag |
| 8,364,959 B2 | 1/2013 | Bhanoo et al. |
| 8,378,623 B2 | 2/2013 | Kusch et al. |
| 8,602,141 B2 | 12/2013 | Yee et al. |
| 8,719,431 B2 | 5/2014 | Reif et al. |
| 8,837,363 B2 | 9/2014 | Jones et al. |
| 8,848,608 B1 * | 9/2014 | Addepalli et al. ............ 370/328 |
| 8,863,256 B1 | 10/2014 | Addepalli et al. |
| 8,989,954 B1 | 3/2015 | Addepalli et al. |
| 9,036,509 B1 | 5/2015 | Addepalli et al. |
| 2001/0033225 A1 | 10/2001 | Razavi et al. |
| 2002/0006139 A1 | 1/2002 | Kikkawa et al. |
| 2002/0072388 A1 | 6/2002 | Korneluk et al. |
| 2002/0097855 A1 | 7/2002 | Neudeck et al. |
| 2002/0103964 A1 | 8/2002 | Igari |
| 2002/0165008 A1 | 11/2002 | Sashihara et al. |
| 2002/0174360 A1 | 11/2002 | Ikeda |
| 2002/0198632 A1 | 12/2002 | Breed et al. |
| 2003/0005435 A1 | 1/2003 | Nelger et al. |
| 2003/0009271 A1 | 1/2003 | Akiyama |
| 2003/0028763 A1 | 2/2003 | Malinen et al. |
| 2003/0033435 A1 | 2/2003 | Hanner |
| 2003/0046228 A1 | 3/2003 | Berney |
| 2003/0051041 A1 | 3/2003 | Kalavade et al. |
| 2003/0083968 A1 | 5/2003 | Marsh et al. |
| 2003/0152038 A1 | 8/2003 | Oshima et al. |
| 2003/0191939 A1 | 10/2003 | Tsai et al. |
| 2004/0008677 A1 * | 1/2004 | Cen ........................ 370/389 |
| 2004/0022216 A1 | 2/2004 | Shi |
| 2004/0023689 A1 | 2/2004 | Ahonen |
| 2004/0024670 A1 | 2/2004 | Valenzuela et al. |
| 2004/0042604 A1 | 3/2004 | Hiltunen et al. |
| 2004/0073339 A1 | 4/2004 | Ruoppolo |
| 2004/0083043 A1 | 4/2004 | Akiyama et al. |
| 2004/0087305 A1 | 5/2004 | Jiang et al. |
| 2004/0137890 A1 | 7/2004 | Kalke |
| 2004/0143386 A1 | 7/2004 | Yoshihara et al. |
| 2004/0162653 A1 | 8/2004 | Ban et al. |
| 2004/0165656 A1 | 8/2004 | Shiue et al. |
| 2004/0171386 A1 | 9/2004 | Mitjana |
| 2004/0204087 A1 | 10/2004 | Carlsson |
| 2004/0229601 A1 | 11/2004 | Zabawskyj et al. |
| 2004/0230345 A1 | 11/2004 | Tzamaloukas |
| 2004/0246966 A1 | 12/2004 | Wu et al. |
| 2004/0249915 A1 | 12/2004 | Russell |
| 2004/0256451 A1 | 12/2004 | Goman et al. |
| 2005/0009563 A1 | 1/2005 | Stenmark |

(56) References Cited

U.S. PATENT DOCUMENTS

| | | |
|---|---|---|
| 2005/0018883 A1 | 1/2005 | Scott |
| 2005/0020250 A1 | 1/2005 | Chaddha et al. |
| 2005/0039027 A1 | 2/2005 | Shapiro |
| 2005/0041660 A1 | 2/2005 | Pennec et al. |
| 2005/0065678 A1 | 3/2005 | Smith et al. |
| 2005/0075137 A1 | 4/2005 | Reemtsma |
| 2005/0101323 A1 | 5/2005 | De Beer |
| 2005/0124288 A1 | 6/2005 | Karmi et al. |
| 2005/0131673 A1 | 6/2005 | Koizumi et al. |
| 2005/0162687 A1 | 7/2005 | Lee |
| 2005/0207408 A1 | 9/2005 | Elliott |
| 2005/0239504 A1 | 10/2005 | Ishi et al. |
| 2005/0266883 A1 | 12/2005 | Chatrath |
| 2005/0271037 A1 | 12/2005 | Habaguchi et al. |
| 2005/0282554 A1 | 12/2005 | Shyy et al. |
| 2006/0020783 A1 | 1/2006 | Fisher |
| 2006/0031590 A1 | 2/2006 | Monette et al. |
| 2006/0059340 A1 | 3/2006 | Eldenmalm et al. |
| 2006/0068786 A1 | 3/2006 | Florence |
| 2006/0075242 A1 | 4/2006 | Aissi et al. |
| 2006/0076420 A1 | 4/2006 | Prevost et al. |
| 2006/0079237 A1 | 4/2006 | Liu et al. |
| 2006/0079254 A1 | 4/2006 | Hogan |
| 2006/0089157 A1 | 4/2006 | Casey |
| 2006/0129311 A1 | 6/2006 | Bauman et al. |
| 2006/0129848 A1 | 6/2006 | Paksoy et al. |
| 2006/0160532 A1 | 7/2006 | Buckley et al. |
| 2006/0172772 A1 | 8/2006 | Bjorkner |
| 2006/0181521 A1 | 8/2006 | Perreault et al. |
| 2006/0183500 A1 | 8/2006 | Choi |
| 2006/0218337 A1 | 9/2006 | Hashimoto |
| 2006/0224887 A1 | 10/2006 | Vesikivi et al. |
| 2006/0234693 A1 | 10/2006 | Isidore et al. |
| 2006/0277589 A1 | 12/2006 | Margis et al. |
| 2006/0282554 A1 | 12/2006 | Jiang et al. |
| 2006/0285538 A1 | 12/2006 | Oommen |
| 2006/0291455 A1 | 12/2006 | Katz et al. |
| 2007/0004457 A1 | 1/2007 | Han |
| 2007/0021847 A1 | 1/2007 | Hyodo et al. |
| 2007/0027583 A1 | 2/2007 | Tamir et al. |
| 2007/0038772 A1 | 2/2007 | Obata |
| 2007/0060200 A1 | 3/2007 | Boris et al. |
| 2007/0067085 A1 | 3/2007 | Lu et al. |
| 2007/0077966 A1 | 4/2007 | Huang |
| 2007/0094337 A1 | 4/2007 | Klassen et al. |
| 2007/0105531 A1 | 5/2007 | Schroeder, Jr. |
| 2007/0124490 A1 | 5/2007 | Kalavade et al. |
| 2007/0129072 A1 | 6/2007 | Yamato et al. |
| 2007/0130156 A1 | 6/2007 | Tenhunen et al. |
| 2007/0139216 A1 | 6/2007 | Breed |
| 2007/0149170 A1 | 6/2007 | Bloebaum et al. |
| 2007/0167161 A1 | 7/2007 | Cheng et al. |
| 2007/0177562 A1 | 8/2007 | Castrogiovanni et al. |
| 2007/0198144 A1 | 8/2007 | Norris et al. |
| 2007/0202895 A1 | 8/2007 | Benco et al. |
| 2007/0218947 A1 | 9/2007 | Buckley |
| 2007/0223031 A1 | 9/2007 | Kitada et al. |
| 2007/0225873 A1 | 9/2007 | Toya et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2007/0265735 A1 | 11/2007 | Chigusa |
| 2007/0266428 A1 | 11/2007 | Downes et al. |
| 2007/0271014 A1 | 11/2007 | Breed |
| 2007/0273492 A1 | 11/2007 | Hara et al. |
| 2008/0020755 A1 | 1/2008 | Liu et al. |
| 2008/0020773 A1 | 1/2008 | Black et al. |
| 2008/0027606 A1 | 1/2008 | Helm |
| 2008/0028230 A1 | 1/2008 | Shatford |
| 2008/0031207 A1* | 2/2008 | Martinez et al. ............. 370/338 |
| 2008/0040005 A1 | 2/2008 | Breed |
| 2008/0043759 A1 | 2/2008 | Poetker et al. |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0122597 A1 | 5/2008 | Englander |
| 2008/0147265 A1 | 6/2008 | Breed |
| 2008/0147271 A1 | 6/2008 | Breed |
| 2008/0169350 A1 | 7/2008 | Audebert et al. |
| 2008/0205416 A1 | 8/2008 | DeChiara |
| 2008/0209545 A1 | 8/2008 | Asano |
| 2008/0220743 A1 | 9/2008 | Mora et al. |
| 2008/0226074 A1* | 9/2008 | Sammour et al. ............. 380/270 |
| 2008/0227604 A1 | 9/2008 | Daniel |
| 2008/0254766 A1 | 10/2008 | Craven |
| 2008/0261561 A1 | 10/2008 | Gehrmann |
| 2008/0265024 A1 | 10/2008 | Tracy et al. |
| 2008/0284575 A1 | 11/2008 | Breed |
| 2008/0289018 A1 | 11/2008 | Kawaguchi |
| 2008/0290161 A1 | 11/2008 | Blake |
| 2008/0311912 A1 | 12/2008 | Balasubramanian et al. |
| 2009/0003283 A1* | 1/2009 | Meylan ......................... 370/331 |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0043441 A1 | 2/2009 | Breed |
| 2009/0061839 A1 | 3/2009 | Zimmerman et al. |
| 2009/0077643 A1 | 3/2009 | Schmidt et al. |
| 2009/0138136 A1 | 5/2009 | Natsume |
| 2009/0154460 A1 | 6/2009 | Varela et al. |
| 2009/0163175 A1 | 6/2009 | Shi et al. |
| 2009/0215449 A1 | 8/2009 | Avner |
| 2009/0225736 A1 | 9/2009 | Patarkazishvili |
| 2009/0227230 A1 | 9/2009 | Camilleri et al. |
| 2009/0265633 A1 | 10/2009 | Lim et al. |
| 2009/0312850 A1 | 12/2009 | Higuchi et al. |
| 2010/0005313 A1 | 1/2010 | Dai |
| 2010/0037057 A1 | 2/2010 | Shim et al. |
| 2010/0070171 A1 | 3/2010 | Barbeau et al. |
| 2010/0085868 A1 | 4/2010 | Guo et al. |
| 2010/0088401 A1 | 4/2010 | DeGraeve et al. |
| 2010/0112997 A1 | 5/2010 | Roundtree |
| 2010/0167724 A1 | 7/2010 | Haran et al. |
| 2010/0183016 A1 | 7/2010 | Bonk et al. |
| 2010/0195724 A1 | 8/2010 | Yoshida et al. |
| 2010/0202346 A1 | 8/2010 | Sitzes et al. |
| 2010/0215043 A1 | 8/2010 | Hisada |
| 2010/0226291 A1* | 9/2010 | Gorbachov .................... 370/280 |
| 2010/0232404 A1 | 9/2010 | Chen et al. |
| 2010/0234009 A1 | 9/2010 | Antani et al. |
| 2010/0234071 A1 | 9/2010 | Shabtay et al. |
| 2010/0248690 A1 | 9/2010 | Biggs et al. |
| 2010/0279653 A1 | 11/2010 | Poltorak |
| 2010/0280956 A1 | 11/2010 | Chutorash et al. |
| 2010/0291924 A1 | 11/2010 | Antrim et al. |
| 2010/0294750 A1 | 11/2010 | Hogenmueller et al. |
| 2010/0311391 A1 | 12/2010 | Siu et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2011/0032952 A1 | 2/2011 | Rochon et al. |
| 2011/0055292 A1 | 3/2011 | Madau et al. |
| 2011/0059738 A1 | 3/2011 | Waller |
| 2011/0071718 A1 | 3/2011 | Norris et al. |
| 2011/0106375 A1 | 5/2011 | Gurusamy |
| 2011/0149982 A1 | 6/2011 | Hwang et al. |
| 2011/0153149 A1 | 6/2011 | Jeon et al. |
| 2012/0004933 A1 | 1/2012 | Foladare et al. |
| 2012/0089299 A1 | 4/2012 | Breed |
| 2012/0109418 A1 | 5/2012 | Lorber |
| 2012/0109446 A1 | 5/2012 | Yousefi et al. |
| 2012/0182935 A1 | 7/2012 | Addepalli et al. |
| 2013/0018575 A1 | 1/2013 | Birken et al. |
| 2013/0159466 A1 | 6/2013 | Mao |

FOREIGN PATENT DOCUMENTS

| | | |
|---|---|---|
| EP | 1696357 | 8/2006 |
| EP | 1727383 | 11/2006 |
| EP | 1737160 | 12/2006 |
| EP | 1758335 | 2/2007 |
| GB | 2294787 | 5/1996 |
| GB | 2313257 A | 11/1997 |

(56) References Cited

FOREIGN PATENT DOCUMENTS

| | | |
|---|---|---|
| GB | 2386803 A | 9/2003 |
| GB | 2406925 | 10/2003 |
| GB | 2406925 | 4/2005 |
| JP | 2000194660 | 7/2000 |
| WO | WO 92/19078 | 10/1992 |
| WO | WO 99/24938 | 5/1999 |
| WO | WO 99/27730 | 6/1999 |
| WO | WO 99/46682 | 9/1999 |
| WO | WO 00/79368 | 12/2000 |
| WO | WO 0111577 | 2/2001 |
| WO | WO 02/067563 | 8/2002 |
| WO | WO 02/089449 | 11/2002 |
| WO | WO 03/007639 | 1/2003 |
| WO | WO 2004/021296 | 3/2004 |
| WO | WO 2005/029890 | 3/2005 |
| WO | WO 2006/094564 | 9/2006 |
| WO | WO 2007/143342 | 12/2007 |
| WO | WO 2008/040964 | 4/2008 |
| WO | WO 2009/082759 | 7/2009 |

OTHER PUBLICATIONS

U.S. Appl. No. 13/117,860, entitled "System and Method for Analyzing Vehicular Behavior in a Network Environment," filed May 27, 2011, Inventors: Sateesh K. Addepalli et al.

U.S. Appl. No. 13/118,220, entitled "System and Method for Routing, Mobility, Application Services, Discovery, and Sensing in a Vehicular Network Environment," filed May 27, 2011, Inventors: Sateesh K. Addepalli et al.

U.S. Appl. No. 13/118,024, entitled "System and Method for Enabling a Vehicular Access Network in a Vehicular Environment," filed May 27, 2011, Inventors: Sateesh K. Addepalli et al.

EPO May 22, 2012 European Search Report and Written Opinion from EP 12150208.2.

EPO Jan. 21, 2013 EPO Response to Communication regarding Written Opinion from EP 12150208.2.

PCT Apr. 22, 2009 International Search Report for PCT/US08/88320; 3 pages.

PCT Jun. 29, 2010 International Preliminary Report on Patentability and Written Opinion of the International Searching Authority for PCT/US08/88320; 10 pages.

U.S. Appl. No. 13/014,605, entitled "System and Method for Enabling Secure Transactions Using Flexible Identity Management in a Vehicular Environment," filed Jan. 26, 2011, Inventors: Sateesh K. Addepalli et al.

U.S. Appl. No. 13/071,367,605, entitled "System and Method for Wireless Interface Selection and for Communication and Access Control of Subsystems, Devices, and Data in a Vehicular Environment," filed Mar. 24, 2011, Inventors: Sateesh K. Addepalli et al.

U.S. Appl. No. 13/083,305, entitled "System and Method for Applications Management in a Networked Vehicular Environment," filed Apr. 8, 2011, Inventors: Sateesh K. Addepalli et al.

U.S. Appl. No. 13/087,884, entitled "System and Method for Discovery, Trusted Execution, and Admission Control in a Vehicular Environment," filed Apr. 15, 2011, Inventors: Sateesh K. Addepalli et al.

U.S. Appl. No. 13/104,737, entitled "System and Method for Internal Networking, Data Optimization and Dynamic Frequency Selection in a Vehicular Environment," filed May 10, 2011, Inventors: Sateesh K. Addepalli et al.

U.S. Appl. No. 13/108,631, entitled "System and Method for Real-Time Synthesis and Performance Enhancement of Audio/Video Data, and Noise Cancellation and Gesture Based User Interfaces in a Vehicular Environment," filed May 10, 2011, Inventors: Sateesh K. Addepalli et al.

U.S. Appl. No. 13/111,425, entitled "System and Method for Providing Resource Sharing, Synchronizing, Media Coordination, Transcoding, and Traffic Management in a Vehicular Environment," filed May 19, 2011, Inventors: Sateesh K. Addepalli et al.

Autonet Mobile, "Autonet Mobile Features, Technology Specifications," autonetmobile.com, 1 page; [retrieved and printed Apr. 8, 2011] http://www.autonetmobile.com/service/anmdev.html.

Autonet Mobile, "CARFI Features, Technology Specifications," autonetmobile.com, 1 page; [retrieved and printed Apr. 8, 2011] http://autonetmobile.com/service/carfidev.html.

Autonet Mobile, "It's What Your Car has been Waiting For," autonetmobile.com, 2 pages; [retrieved and printed Apr. 8, 2011] http://www.autonetmobile.com/service/.

"Cisco Mobile Network Solutions for Commercial Transit Agencies," Cisco.com, © 2008 Cisco Systems, Inc., 8 pages; http://www.cisco.com/en/US/prod/collateral/routers/ps272/white_paper_c11-4921115.html.

"Cisco Mobile Network Solutions for Public Safety," Cisco.com, 2008 Cisco Systems, Inc., 7 pages; http://www.cisco.com/en/US/prod/collateral/routers/ps272/prod_white_paper0900aecd806220af.html.

Farinacci, D. et al., "LISP Mobile Node," Network Working Group Internet Draft, Feb. 1, 2010, 22 pages; http://tools.ietf.org/id/draft-meyer-lisp-mn-01.txt.

Ibars, Christian et al., "Wireless Services in the Connected Vehicle Era," IEEE Communications Magazine, Dec. 23, 2010, 13 pages.

Robert Bosch GmbH, *Automotive Electrics Automotive Electronics, Systems and Components, New: Networking Hybrid Drive*, 5$^{th}$ Edition, Nov. 2007, BentleyPublishers.com, 255 pages (two parts submitted: Part 1—121 pages; Part 2—131 pages).

Lillian Lei Dai, *"Proactive Mobile Wireless Networks: an infrastructureless wireless network architecture for delay-sensitive applications,"* Massachusetts Institute of Technology, Jun. 2008 (two parts submitted: Part 1—105 pages; Part 2—97 pages).

Zeldovich, Nickalai et al., "Making Information Flow Explicit in HiStar," OSDI '06: 7$^{th}$ USENIX Symposium on Operating Systems Design and Implementation, Nov. 2006, 16 pages.

Zeldovich, Nickolai et al., "Security Distributed Systems with Information Flow Control," NSDI '08: 5$^{th}$ USENIX Symposium on Networked Systems Design and Implementation, Apr. 2008, 16 pages.

Ibars, Christian et al., "Radio Resource Allocation for a High Capacity Vehicular Access Network," 4th International Symposium on Wireless Vehicular Communications: WIVEC2011, Sep. 5-6, 2011, San Francisco, CA; U.S., 5 pages, http://www.ieeevtc.org/wivec2011/.

EPO Jul. 1, 2013 EPO Communication regarding EP 12150208.2; 5 pages.

U.S. Appl. No. 13/943,114, entitled "System and Method for Enabling a Vehicular Access Network in a Vehicular Environment," filed Jul. 16, 2013, Inventors: Sateesh K. Addepalli et al.

"TCG Mobile Trusted Module Specification." Trusted Computing Group, Specification version 1.0, Revision 6, Jun. 2008, 105 pages; [Retrieved and printed Apr. 8, 2011] http://www.trustedcomputinggroup.org/files/resource_files/87852F33-1D09-3519-AD0C0F141CC6B10D/Revision_6-tcg-mobile-trusted-module-1_0.pdf.

Alves, T., et al., "TrustZone: Integrated Hardware and Software Security," Information Quarterly, vol. 3, No. 4, 2004, pp. 18-24; [Retrieved and printed Apr. 8, 2011] http://www.iqmagazineonline.com/magazine/pdf/v_3_4_pdf/Pg18_24_custZone_Secur.pdf.

Arsenault, A., et al., "Securely Available Credentials—Requirements," IETF, Network Working Group, RFC 3157, Baltimore Technologies, Aug. 2001, 20 pages.

Bickhart, Ryan W., et al., "Transparent TCP-to-SCTP Translation Shim Layer," EuroBSDCon 2007, Copenhagen, Denmark, Sep. 17-18, 2007; 14 pages.

Bilstrup, "A Survey Regarding Wireless Communication Standards Intended for a High-Speed Vehicle Environment," Technical Report IDE0712, Feb. 2007, 51 pages.

Blazevic, Ljubica, et al., "A Location-Based Routing Method for Mobile Ad Hoc Networks," IEEE Transactions on Mobile Computing, vol. 4, No. 2, Mar./Apr. 2005; 14 pages.

Boman, K., Niemi, V., et al. "UMTS Security," Electronics and Communication Engineerying Journal, Oct. 2002, 14 pages; http://www.it.iitb.ac.in/~kavita/GSM_Security_Papers/New%20papers/umts_security.pdf.

(56) References Cited

OTHER PUBLICATIONS

Dierks, T., et al., "The Transport Layer Security (TLS) Protocol," (Version 1.1), Network Working Group, RFC 4346, Apr. 2006, 87 pages; http://www.rfc-editor.org/rfc/pdfrfc/rfc4346.txt.pdf.

Harkins, D., et al., "The Internet Key Exchange (IKE)," Network Working Group, RFC 2409, Nov. 1998, 41 pages; http://www.rfc-editor.org/rfc/pdfrfc/rfc2409.txt.pdf.

Hsu, WAVE/DSRC Development and Standardization, Industrial Technology Research Institute, Oct. 1, 2010, 84 pages.

Kent, S., et al., "Security Architecture for the Internet Protocol," Network Working Group, RFC 2401, Nov. 1998, 66 pages; http://www.rfc-editor.org/rfc/pdfrfc/rfc2401.txt.pdf.

Scarfone, Karen et al., "Guide to Instrusion Detection and Prevention Systems (IDPS)," NIST (National Institute of Standards and Technology), Special Publication 800-94, Feb. 2007, 127 pages; http://csrc.ncsl.nist.gov/publications/nistpubs/800-94/SP800-94.pdf.

Shevade, Updendra et al., "Enabling High-Bandwidth Vehicular Content Distribution," ACM CoNEXT 2010, Philadelphia, PA, Nov. 2010, 12 pages http://www.cs.utexas.edu/~lili/papers/pub/conext10.pdf.

Weigle, Dr. Michele, "Standards: WAVE/DSCRC/802.11p, CS 795/895 Vehicular Networks," Old Dominion University, Spring 2008, 19 pages.

Freeman, Shanna, "How OnStar Works," HowStuffWorks.com, a Discovery Company; [Retrieved and printed Jul. 19, 2013] http://auto.howstuffworks.com/onstar2.htm/printable.

Wahab, et al.,"Driving Profile Modeling and Recognition Based on Soft Computer Approach," IEEE Transactions on Neural Networks, vol. 20, No. 4, Apr. 2009.

U.S. Appl. No. 14/484,664, entitled "System and Method for Enabling Secure Transactions Using Flexible Identity Management in a Vehicular Environment," filed Sep. 12, 2014, Inventors: Sateesh K. Addepalli et al.

U.S. Appl. No. 14/485,050, entitled "System and Method for Wireless Interface Selection and for Communication and Access Control of Subsystems, Devices, and Data in a Vehicular Environment," filed Sep. 12, 2014, Inventors: Sateesh K. Addepalli et al.

U.S. Appl. No. 14/243,304, entitled "System and Method for Real-Time Synthesis and Performance Enhancement of Audio/Video Data, and Noise Cancellation and Gesture Based User Interfaces in a Vehicular Environment," filed Apr. 2, 2014, Inventors: Sateesh K. Addepalli et al.

U.S. Appl. No. 14/242,122, entitled "System and Method for Internal Networking, Data Optimization and Dynamic Frequency Selection in a Vehicular Environment," filed Apr. 1, 2014, Inventors: Sateesh K. Addepalli et al.

Petrescu, et al., "Joint IP Networking and Radio Architecture for Vehicular Networks," 11th International Conference on ITS Telecommunications, Aug. 2011, St. Petersburg, Germany; 7 pages.

\* cited by examiner

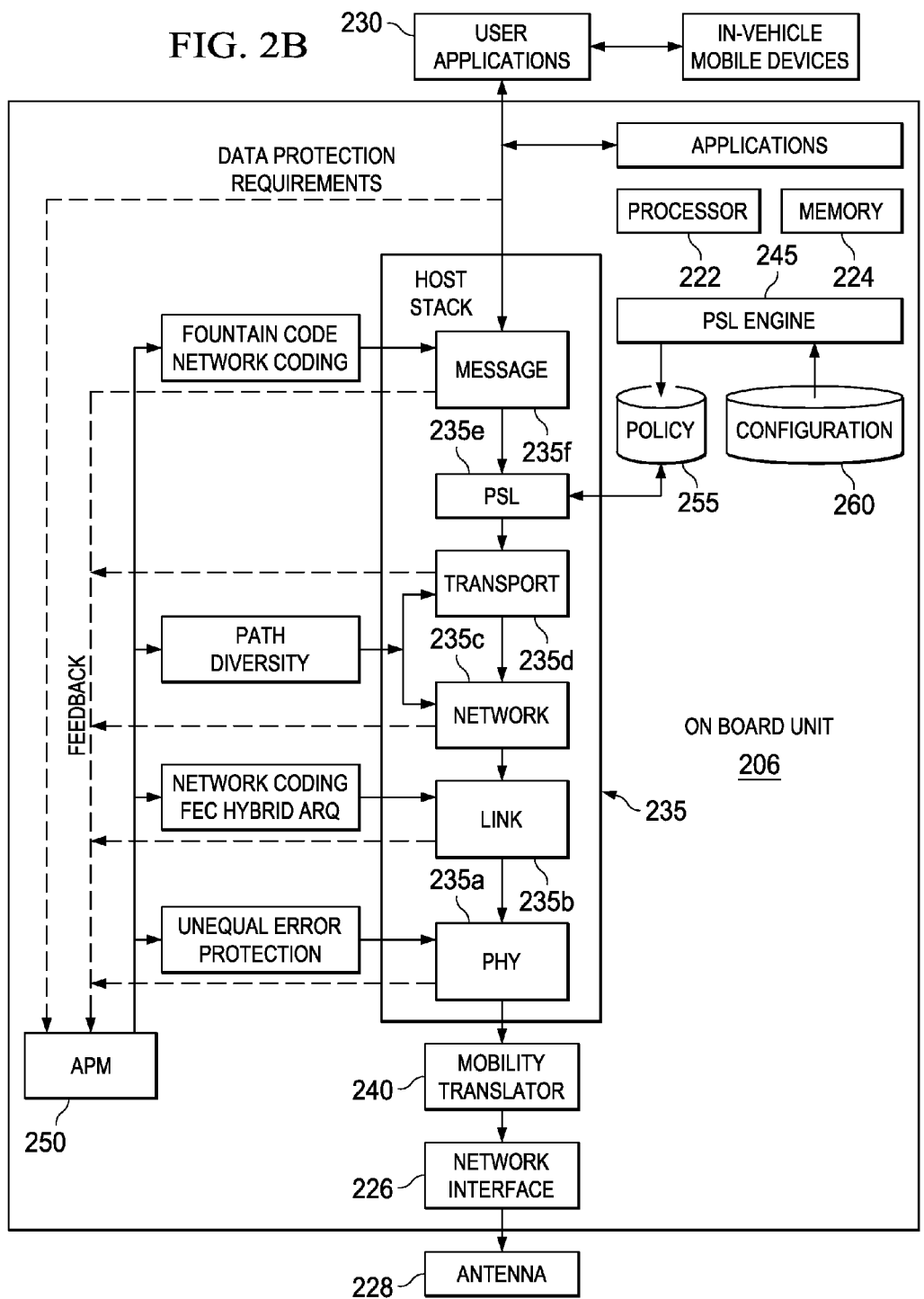

US 9,154,900 B1

SYSTEM AND METHOD FOR TRANSPORT, NETWORK, TRANSLATION, AND ADAPTIVE CODING IN A VEHICULAR NETWORK ENVIRONMENT

CROSS-REFERENCE TO RELATED APPLICATION

This application claims the benefit of priority under 35 U.S.C. §119(e) of U.S. Provisional Application Ser. No. 61/433,138, filed Jan. 14, 2011, by Sateesh K. Addepalli, et al., entitled "SYSTEM, METHOD, AND PROCESSES ASSOCIATED WITH CONNECTED VEHICLES," which is hereby incorporated by reference in its entirety.

TECHNICAL FIELD

This specification relates in general to the field of communications, and more particularly, to a system and method for transport, network, translation, and adaptive coding in a vehicular network environment.

BACKGROUND

Networking architectures have grown increasingly complex and have been designed for use in a wide variety of communications environments. Demand continues to rise among the subscriber base of end users for network access across diverse network environments. In particular, configuring suitable network architecture for vehicular environments (e.g., automobiles, airplanes, trains, boats, etc.) presents unique difficulties. For example, many legacy applications may not support mobility or multi-homing and thus may be of limited value in a vehicular network. Another obstacle is the lack of interoperability between various mobility schemes, which can create isolated pockets of mobile networks having nodes that cannot communicate with nodes belonging to a different type of mobile network. Moreover, the high variability and availability of wireless links due to vehicle mobility can adversely affect quality of service in a vehicular environment. High packet losses due to the varying wireless channel characteristics can cause significant degradation in the quality and quantity of services that can be provided to subscribers. Thus, providing a comprehensive architecture that can provide a quality user experience by integrating legacy applications, enabling interoperability between disparate mobility schemes, and mitigating temporary network disconnections continues to present significant challenges to system designers, automobile manufacturers, service providers, and the like.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2B is a simplified block diagram illustrating additional details that may be associated with one potential embodiment of an on-board unit in the network environment;

DETAILED DESCRIPTION OF EXAMPLE EMBODIMENTS

Overview

A method is provided in one example embodiment that includes intercepting a lookup request from a first mobile node using a first mobile scheme and retrieving control information for a second mobile node using a second mobile scheme based on the lookup request. The control information may be forwarded to the first mobile node, and a data plane between the first mobile node and the second mobile node can be established. Packets exchanged between the first mobile node and the second mobile node can be intercepted and translated from the first mobile scheme to the second mobile scheme and vice versa.

In other embodiments, a method may be provided that includes receiving a request to exchange data over a network using a first protocol and matching parameters associated with the first protocol to a match pattern. An action set associated with the match pattern may be applied to modify the request to conform to a second protocol, and the data may be exchanged over the network using the second protocol.

In yet other embodiments, a method may be provided that includes receiving a request to exchange data between a source node and a destination node over a network. The request may be analyzed to determine data protection requirements, and a combination of data protection schemes can be selected dynamically and applied across network layers.

Example Embodiments

Figure 1:
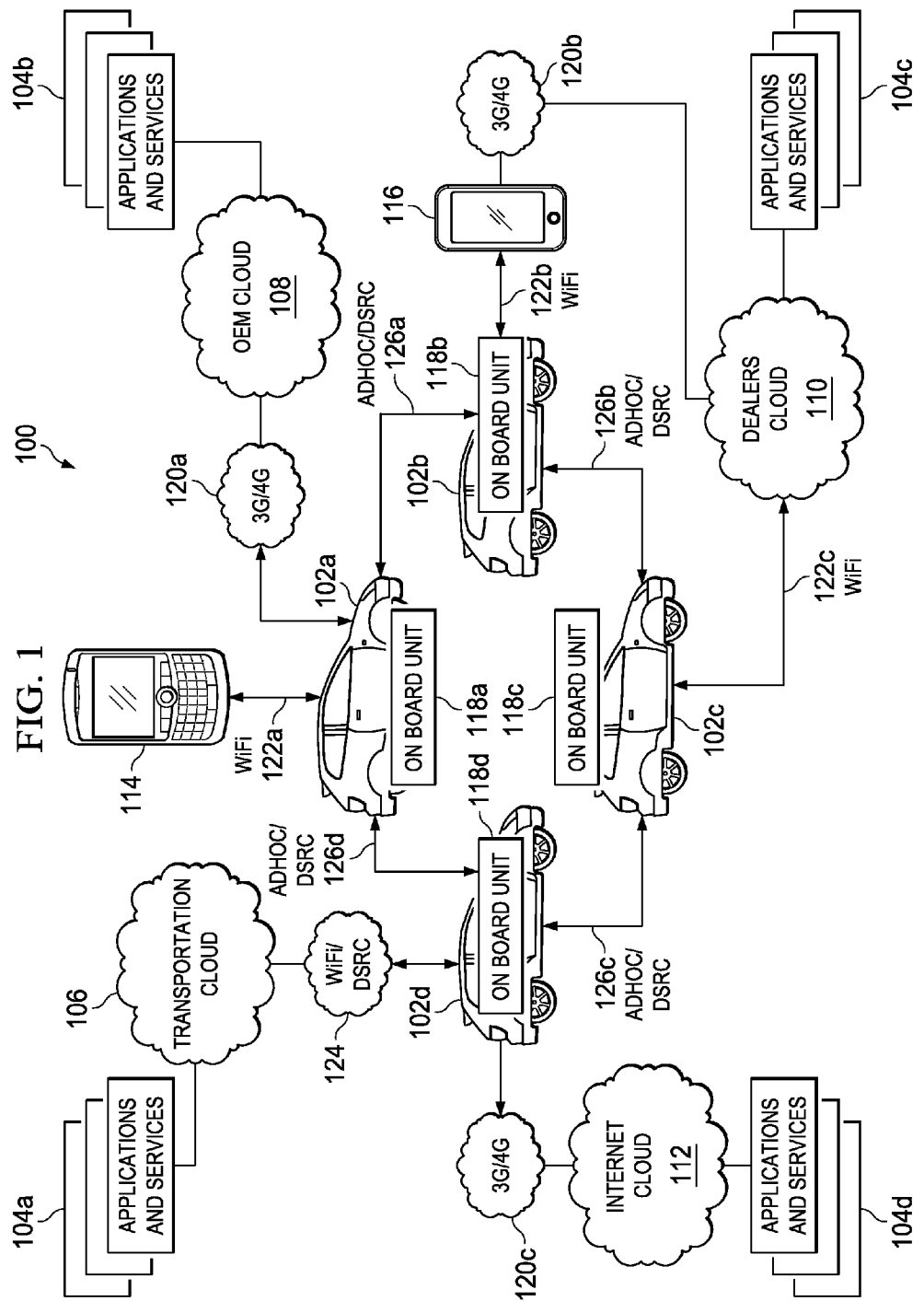
FIG. 1 is a simplified block diagram illustrating an example embodiment of a network environment in accordance with this specification.

Turning to FIG. 1, FIG. 1 is a simplified block diagram of an example embodiment of a network environment 100 in accordance with this specification. The example embodiment of FIG. 1 includes connected vehicles 102a-d in communication with applications and services 104a-d through various communication networks, including transportation cloud 106, OEM cloud 108, dealer cloud 110, and Internet cloud 112. Each of connected vehicles 102a-d may also be in communication with various mobile devices, such as in-vehicle mobile devices 114 and 116. In general, each connected vehicle 102a-d may include an on-board unit (OBU) 118a-d that can establish and manage communications over any viable pathway, such as 3G/4G networks 120a-c, WiFi networks 122a-c, WiFi dedicated short range communication (DSRC) 124, and ad hoc DSRC 126a-d, for example.

Figure 2A:
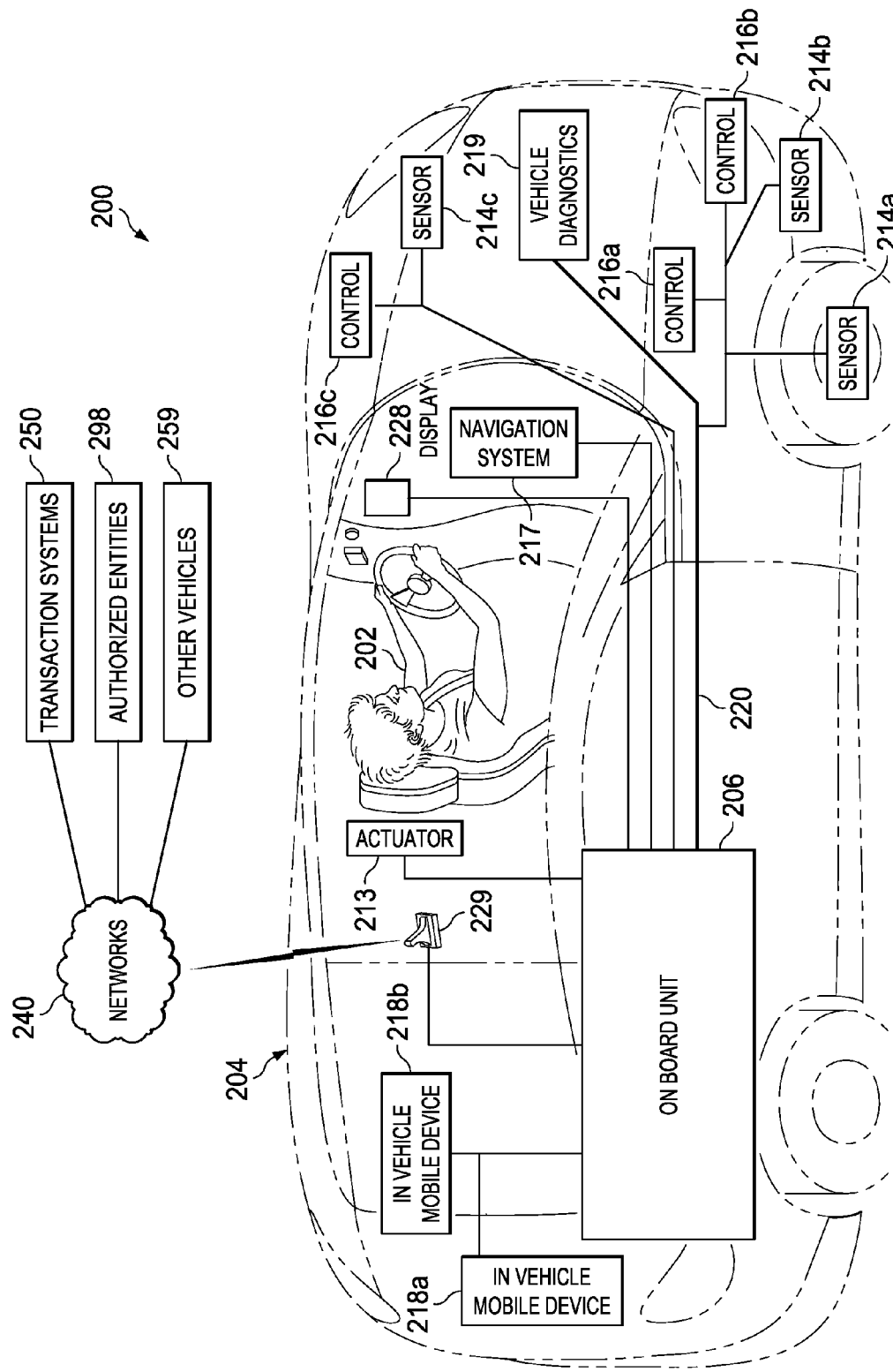
FIG. 2A is a simplified block diagram illustrating additional details that may be associated with a connected vehicle in the network environment.

FIG. 2A is a simplified block diagram illustrating additional details that may be associated with a connected vehicle in the example embodiment of network environment 100. FIG. 2A includes a communication system 200 for transport, network, translation, and adaptive coding in a vehicle network environment. The example architecture of FIG. 2A includes an end user (driver) 202 operating a vehicle 204 that includes an OBU 206, which can be suitably coupled to nodes in communication system 200. A node may be any device (e.g., a machine device or a mobile device), network element, client, server, peer, service, application, or other object capable of sending, receiving, or forwarding information over a communications channel in a network.

Thus, OBU 206 may be coupled to machine devices in communication system 200 through a network, such as a controller area network (CAN) or an IP-based local area network, for example. As illustrated in FIG. 2A, OBU 206 is coupled to machine devices through CAN 220. As used herein, the term 'machine device' is meant to encompass sensors, such as sensors 214a-c, electronic control units (ECUs) such as controls 216a-c, actuators such as actuator 213, navigation systems such as navigation system 217, and displays such as display 228. Machine devices may further include instruments, embedded devices, media devices, infotainment systems, other peripheral or auxiliary devices or components, etc. Machine devices may be physically distributed across the vehicle in a vehicle subsystem, consolidated in any way, provisioned in proprietary configurations, or otherwise configured based on particular networking, vehicle, and/or end user needs. In one example embodiment, sensors 214a-b and controls 216a-b may be part of an automotive diagnostic system, indicated by vehicle diagnostics 219, which may also be suitably integrated with OBU 206.

OBU 206 may also be suitably coupled to various mobile devices at any given time, where such devices may be associated with particular end users (passengers or driver) within vehicle 204. Mobile devices, such as in-vehicle mobile devices 218a-b, are inclusive of mobile phones, smart mobile phones (smartphones), e-book readers, tablets, iPads, personal digital assistants (PDAs), laptops or electronic notebooks, portable navigation systems, multimedia gadgets (e.g., cameras, players, etc.), gaming systems, and any other device, component, element, or object capable of initiating voice, audio, video, media, or data exchanges within communication system 200. Data, as used herein, refers to any type of numeric, voice, video, or script data, or any type of source or object code, or any other suitable information in any appropriate format that may be communicated from one point to another in electronic devices and/or networks.

FIG. 2A also includes network 240, representing various types of connectivity to vehicle 204 (e.g., via antenna 229). Each established network 240 has a logical coupling to remote network nodes, such as transaction systems 250 (which may include applications and services 104a-d), authorized entities 298, other vehicles 259, or other external electronic devices.

Elements of FIG. 1 and FIG. 2A may be coupled to one another through one or more interfaces employing any suitable connection (wired or wireless), which provides a viable pathway for electronic communications. Additionally, any one or more of these elements may be combined or removed from the architecture based on particular configuration needs. Communication system 200 may include a configuration capable of transmission control protocol/Internet protocol (TCP/IP) communications for the electronic transmission or reception of packets in a network. Communication system 200 may also operate in conjunction with a user datagram protocol/IP (UDP/IP) or any other suitable protocol, where appropriate and based on particular needs. In addition, communication system 200 may also include a configuration capable of accommodating legacy bus subsystems or IP-based systems such as Ethernet that may be employed to convey information across the myriad of machine devices (e.g., sensors 214a-c, controls 216a-c, actuator 213) in vehicle 204.

For purposes of illustrating the operational aspects of communication system 200, it is important to first understand the activities and problems that may be present in electronic communication scenarios in a vehicular environment such as the one shown in FIG. 1 and FIG. 2A. The following foundational information may be viewed as a basis from which the present disclosure may be properly explained. Such information is offered earnestly for purposes of explanation only and, accordingly, should not be construed in any way to limit the broad scope of this disclosure and its potential applications.

Many modern vehicles include some degree of internal data processing capability and network communication. Originally, vehicle networks were confined by the boundaries of the vehicle itself, but with the advent of global positioning systems and satellite radio, external communication is becoming more commonplace as well. More complex vehicular communication systems continue to emerge as a type of network having many disparate nodes, such as vehicles, roadside stations, mobile wireless devices, and traffic control devices.

As vehicular networks continue to evolve, new protocols may be implemented to facilitate communications between nodes—particularly new transport (L4) and network (L3) protocols between mobile nodes. However, adapting existing applications to work with new protocols can present a significant hurdle. For example, original source code may be unavailable or may require significant modification to use new socket application programming interfaces (APIs). Unless source code is modified, though, applications may be tied to their original choice of transport or network protocol and unable to leverage the features and services from newer protocols on the host's stack. Such a limitation is particularly undesirable when new protocols have the potential to improve application performance and/or network efficiency.

For example, TCP does not support multihoming or multistreaming, but other transport protocols such as Stream Control Transmission Protocol (SCTP) do support these features. Thus, a legacy TCP application that cannot be recompiled cannot benefit from these transport services. Likewise, such an application cannot leverage other networking advancements like the Datagram Congestion Control Protocol (DCCP) and IPv6, for example.

IP or other L3 mobility can be critical to many adjacencies, including connected vehicles. Different mobility protocols, such as Mobile IP and Location/Identifier Separation Protocol for Mobile Node (LISP-MN), can provide needed mobility solutions, but each such mobility scheme generally assumes that a mobile node is communicating with either a non-mobile node or a mobile node that implements the same mobility scheme. The different mobility schemes lack interoperability, and thereby can create isolated pockets of mobile networks having nodes that cannot efficiently communicate with nodes belonging to a different type of mobile network.

High mobility of nodes and constantly varying channel conditions also present many challenges to wireless communication in a vehicular network environment. High packet losses due to varying wireless channel characteristics can cause degradation in the quality and quantity of services that can be provided to a subscriber. A subscriber may find the quality of the service unacceptable, particularly in comparison to services to which the subscriber may already be accustomed, such as home Internet services. Thus, systems are needed that counter the effects of unpredictable and highly variable channel conditions to deliver an acceptable quality of service to a subscriber.

In accordance with embodiments disclosed herein, communication system 200 can overcome these shortcomings (and others) by providing translation services to facilitate interoperation between mobility schemes, transport and network services for legacy applications, and message, packet, link and physical layer adaptive coding.

For example, communication system 200 may include a mobility translator that translates across different mobility schemes. In more particular embodiments, a mobility translator may be provided in a network element, such as a gateway. A network element may also include a network appliance, server, router, switch, bridge, loadbalancer, firewall, processor, module, or any other suitable device, component, element, or object operable to exchange information in a network environment. A mobility translator can provide control and data plane functions on behalf of a mobile node so that the mobile node can seamlessly communicate with another node implementing and/or understanding a different mobility scheme, and vice versa. Accordingly, a mobility translator can enable different mobility schemes to interoperate and/or coexist instead of competing with each other. A mobility translator can also provide a mechanism for legacy mobile networks to adopt new network mobility schemes or models while substantially reducing or eliminating the need for upgrades to equipment, software, or policies, for example.

Communication system 200 may additionally or alternatively include a configurable pseudo-socket layer (PSL) that can enable legacy applications to leverage features and services of L3 and L4 protocols that may not be available in the application's original choice of protocols. For example, a configurable PSL can expose a generic, backward-compatible socket API to applications that does not require changing an application's source code. The PSL can intercept the application's API calls and take actions based on certain configurable policies, thereby enabling the application to benefit from new L4 through L3 services. The PSL can be extended to leverage services from a wide variety of protocols, including L4 protocols such as multipath TCP, SCTP, DCCP, and UDP, and L3 protocols such as IPv4 and IPv6, for example. Other examples of protocols that may be leveraged through a PSL in accordance with this specification include Host Identity Protocol (HIP), Transport Layer Security (TLS), and Datagram TLS (DTLS). Transport mappings can range from a simple one-to-one mapping (e.g., mapping one TCP connection to one DCCP connection) to more complex m:n mappings (e.g., mapping m TCP connections to n SCTP multistream associations), based on polices for example. Thus, in certain embodiments, a PSL may be driven by policy configurations, which can be modified depending on various environmental conditions, application requirements, and user preferences. In addition, a PSL can dynamically discover services available from a peer and adapt behavior accordingly. The services provided by a PSL in accordance with this specification can provide an application with better performance and security while also improving network efficiency.

Communication system 200 may also provide multiple levels of protection to data that is being exchanged over a wireless channel to maximize performance jointly across different links. Since an OBU can be the ingress and egress point for all on-board nodes, an OBU may act as a gateway between all on-board nodes and a vehicular network environment, such as network environment 100, and maintain complete knowledge of the priority of data being transmitted and the characteristics of the wireless channel being used by radio interfaces (e.g., WiFi, 3G, Bluetooth, etc.) The OBU can implement an adaptive protection manager to dynamically select an optimal combination of coding and data protection schemes across different network layers, wireless networks, applications, and operating scenarios so as to maximum some utility function or metric. More particularly, an OBU can collect and measure statistics and select a coding scheme (or set of coding schemes) from a set of available schemes, providing a particular level of protection, to be used for each type of data, leveraging known interactions of data flow through the stack to improve the chances of successfully delivering the data to the destination. For example, network coding combined with physical layer coding may provide performance that is more favorable. This combination of coding schemes may be realized between, for example, a controller and OBU as traffic passes through. Furthermore, as a vehicle moves, an OBU may be connected to different wireless networks and a coding scheme can be adapted to interface changes. Coding negotiation may take place between two OBUs or between an OBU and a network infrastructure device or network element, such as a controller, which can enable optimal data transport between OBUs or OBU and infrastructure without modifying subscriber devices. As used herein, 'infrastructure' is intended to mean nodes, network elements, access points, base stations, and any other device, element, or object that can facilitate sending and receiving communications in a vehicular network environment.

Providing protection at multiple layers may have many advantages, including fine-grained and differentiated data protection. Since data can be interpreted differently at each layer of the network stack, coding at multiple layers allows management of the context in which data is protected. Furthermore, different types of data can be offered different levels of protection, based on quality of service (QoS) requirements and priority, for example. Multi-layer coding can also facilitate adapting to channel conditions, since it is possible for higher layers to interpret the data even if lower layers cannot recover all errors. Each layer can also change its coding strategy in response to lost or damaged data, which provides greater flexibility in handling variable channel conditions while avoiding or eliminating a single point of failure (e.g., increasing strength of a physical layer coding scheme alone may be of no use if a wireless channel experiences deep fades).

Turning to the infrastructure of FIG. 2A, end user 202 can be associated with a person (e.g., a driver or passenger) having any type of relationship to the vehicle such as an owner, a renter, a temporary driver, a family member or friend of the owner, etc. End user 202 may initiate communication in communication system 200 via some network, and such communication may be initiated through any suitable node, inclusive of an in-vehicle mobile device 218a or 218b, display 228, and navigation system 217. In one embodiment, additional displays may be provided for one or more passengers in vehicle 204.

In-vehicle mobile devices 218a-b, and mobile devices external to vehicle 204, may communicate with OBU 206 of communication system 204 through any wired or wireless communication link and may be configured as a personal area network (PAN) or a wireless personal area network (WPAN) or any other appropriate architecture or system that facilitates communications in a network environment. Wired and wireless communication links may be inclusive of any electronic link such as Bluetooth, near-field communication (NFC), wireless technologies (e.g., IEEE 802.11x), a USB cable, an HDMI cable, etc. Connection between mobile devices and OBU 206 may be configured based on particular needs and logistics. In one particular example, an external mobile device may be connected to OBU 206 through a USB cable or wireless network when, for example, the external mobile device is a diagnostic tool used by a mechanic for servicing vehicle 204.

Network 240 represents nodes of interconnected communication paths for receiving and transmitting packets of information that propagate through communication system 200. Network 240 offers communicative interfaces between any of the components of FIG. 2A and remote network nodes (e.g., transaction systems 250, authorized entities 298, and other vehicles 259), and may be any local area network (LAN), wireless local area network (WLAN), wide area network (WAN), wireless wide area network (WWAN), metropolitan area network (MAN), wireless metropolitan area network (WMAN), wireless single hop or multi-hop vehicle-to-vehicle network, virtual private network (VPN), Intranet, Extranet, or any other appropriate architecture or system that facilitates communications in a network environment. Network 240 may include any suitable communication link to OBU 206 such as wireless technologies (e.g., IEEE 802.11x, 802.16, WiFi, WiMAX, near-field communication (NFC), DSRC, etc.), satellite, cellular technologies (e.g., 3G, 4G, LTE, GSM/WCDMA/HSPA, CDMA1x/EVDO, etc.), etc., or any suitable combination thereof. Network 240 may also include configurations capable of TCP/IP communications, UDP/IP, or any other suitable protocol, where appropriate and based on particular needs.

In the particular example embodiment of FIG. 2A, vehicle 204 includes capabilities associated with navigation system 217 and vehicle diagnostics 219. Navigation system 217 may be provided in various embodiments including, for example, a portable navigation system or, alternatively, a fixed navigation system, each of which may be configured for wireless or wired communications to OBU 206. Other more specific machine devices, not shown in FIG. 2A, may include display panel instruments, climate controls, interior lights, door locks, trunk open/shut actuator, hood open/shut actuator, seat heater and/or cooler, sunroof open/shut actuator, window heater/defroster/defogger, entertainment systems (e.g., speakers, radio, DVD, CD, etc.), and the like.

FIG. 2B is a simplified block diagram illustrating additional details that may be associated with one potential embodiment of OBU 206. As shown, OBU 206 can include a processor element 222, a memory element 224, and a network interface 226. Network interface 226 may include one or more distinct interfaces to facilitate communication via the various networks described herein. Network interface 226 may be inclusive of multiple wireless interfaces (e.g., WiFi, WiMAX, 3G, 4G, white space, 802.11x, 60 GHz, satellite, Bluetooth, NFC, LTE, GSM/WCDMA/HSPA, CDMA1x/EVDO, DSRC, GPS, etc.) adapted to transmit and receive signals through an antenna 228. Other interfaces represented by network interface 226, may include physical ports (e.g., Ethernet, USB, HDMI, etc.), and the like. Similarly, each of the network elements and user equipment (e.g., mobile devices) of communication system 200 can also include suitable interfaces for receiving, transmitting, and/or otherwise communicating data or information in a network environment.

OBU 206 may further include a user application 230, a host stack 235, a mobility translator 240, a PSL engine 245, and an adaptive protection manager (APM) 250. Host stack 235 is generally comprised of a physical (PHY) layer 235a, a link layer 235b, a network layer 235c, a transport layer 235d, a PSL 235e, and a message layer 235f. To facilitate certain operations OBU 206 may also include various databases, such as a virtual socket API policy database 255 and configuration database 260. Such databases can be consolidated with memory elements (or vice versa), or the storage can overlap/exist in any other suitable manner. Policy database 255 may be populated with virtual socket rules, for example. In some embodiments, a rule may consist of two parts: (i) a match pattern, and (ii) an action set to perform when a socket matches the pattern in (i). A match pattern may, for example, consist of L4 through L3 parameters (or a combination) such as a destination/source IP address and port, L4 protocol type, L3 protocol type, etc. The action set can enable PSL 235 to modify L4 through L3 parameters and services for a socket, for example. Configuration database 260 may contain various system-wide polices, user preferences, and/or application specific settings, for example.

Each layer in host stack 235 can use any coding scheme from a defined set. APM 250 is adapted to receive data protection requirements as input from applications and devices, such as user application 230, along with content data. Based on feedback received from each layer (denoted by dashed lines in FIG. 2B), APM 250 can calculate an optimum coding scheme for each layer to improve the probability of delivering data to its final destination, and can instruct each layer to perform the selected coding scheme. Thus, the data can be transformed as it flows through the different layers before being transmitted out through a radio interface, such as antenna 228.

Message layer 235f can receive raw data generated by an application, such as user application 230, and can have the same context as the application. APM 250 may select a coding scheme that attempts to target or leverage specific features or patterns of the data to provide a better user experience. For example, when transmitting live video streams, I-frames can be protected more than other frames as they typically contain more information and provide a better user experience.

In transport layer 235d and network layer 235c, the context of input data is generally a packet of a fixed length, and APM 250 may select a coding scheme for these layers to improve the delivery probability of each packet to its destination, for example. Coding schemes such as path diversity, network coding, and multicast routing can be used to improve the delivery probability in various embodiments.

In link layer 235b, the data context may also be a packet, but APM 250 may select a coding scheme to increase the delivery probability of a packet to an immediate neighbor in the routing path. Typical coding schemes may include forward error correction (FEC), Hybrid ARQ, etc.

The data context in PHY layer 235a may be a stream of bits and the transformation from the stream of bits to analog symbols can be determined in this layer. Coding schemes at this layer may include gray codes, unequal error protection (UEP), bit interleaving/scrambling, etc.

OBU 206 can include one or more memory elements (e.g., memory element 224) for storing information to be used in achieving operations as outlined herein. OBU 206 may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 200 could be provided in any database, register, table, cache, queue, control list, or storage structure, based on particular needs and implementations, all of which could be referenced in any suitable timeframe. Any of the memory or storage items discussed herein should be construed as being encompassed within the broad term 'memory element' as used herein.

In one example implementation, communication system 200 may include software (e.g., as part of OBU 206, in-vehicle mobile devices 218a-b, etc.) to achieve or foster the operations outlined herein. In other embodiments, features may be provided externally to these elements, or included in some other network element to achieve this intended functionality. Alternatively, these elements include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

In example embodiments, the operations outlined herein may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory element 224) can store data used for the operations described herein. This includes the memory elements being able to store software, logic, code, or processor instructions that are executed to carry out the activities described in this specification.

Additionally, OBU 206 may include processing elements, such as a processor 222, that can execute software or algorithms to perform the activities described herein. A processor can execute any type of instructions associated with the data to achieve the operations detailed in this specification. In one example, the processor elements may transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this specification should be construed as being encompassed within the broad term 'processor.'

Regarding a physical implementation of OBU 206, any suitable permutation may be applied based on particular needs and requirements, including the design of the particular vehicle in which OBU 206 is implemented. In example implementations, various components of OBU 206 may be installed in different physical areas of the vehicle or may be installed as single unit, with display 228 being positioned to allow driver access. Other displays may be provided in suitable locations for access by passengers in particular passenger seats. In one implementation, multimedia, networking, and communication components may be positioned at some distance from the vehicle engine (e.g., in or near the rear or trunk area if the engine is in the front area of the vehicle).

OBU 206 may be implemented to provide one or more suitable communication interfaces to legacy systems in vehicles such as, for example, a CAN, a low speed network (LIN), a flexray communications protocol network, media oriented systems transport (MOST), and the like. Typically, multiple ECUs, with different embedded software, may be found in a single automobile and may communicate via a CAN bus. Sensors 214a-b may represent, for example, wheel and headlight sensors, respectively. Controls 216a-b may be inclusive of any embedded system or ECU that controls one or more of the electrical systems or subsystems in vehicle 204. Actuator 213 represents a vehicle-setting device such as, for example, a seat positioning device for adjusting various seat positions (e.g., longitudinal position relative to the brake and gas pedals, tilt position, lumbar support, etc.). Actuator 213 and other similar vehicle setting devices (e.g., temperature controls, sunroof, door locks, power windows, etc.) may be configured for communications in a LIN bus, in one embodiment. Sensor 214c represents a type of sensor or device that may be configured for communications via flexray communications protocol (e.g., a radar collision sensor). Control 216c, representing one or more ECUs, may be suitably integrated for controlling the flexray network and sensors and other associated components. Additionally, OBU 206 may be implemented to provide one or more suitable communication interfaces (e.g., network interface 226) to an Internet Protocol (IP) network, user datagram protocol (UDP) network, or any other suitable protocol or communication architecture provided to enable network communication with machine devices in vehicle 204.

Figure 3:
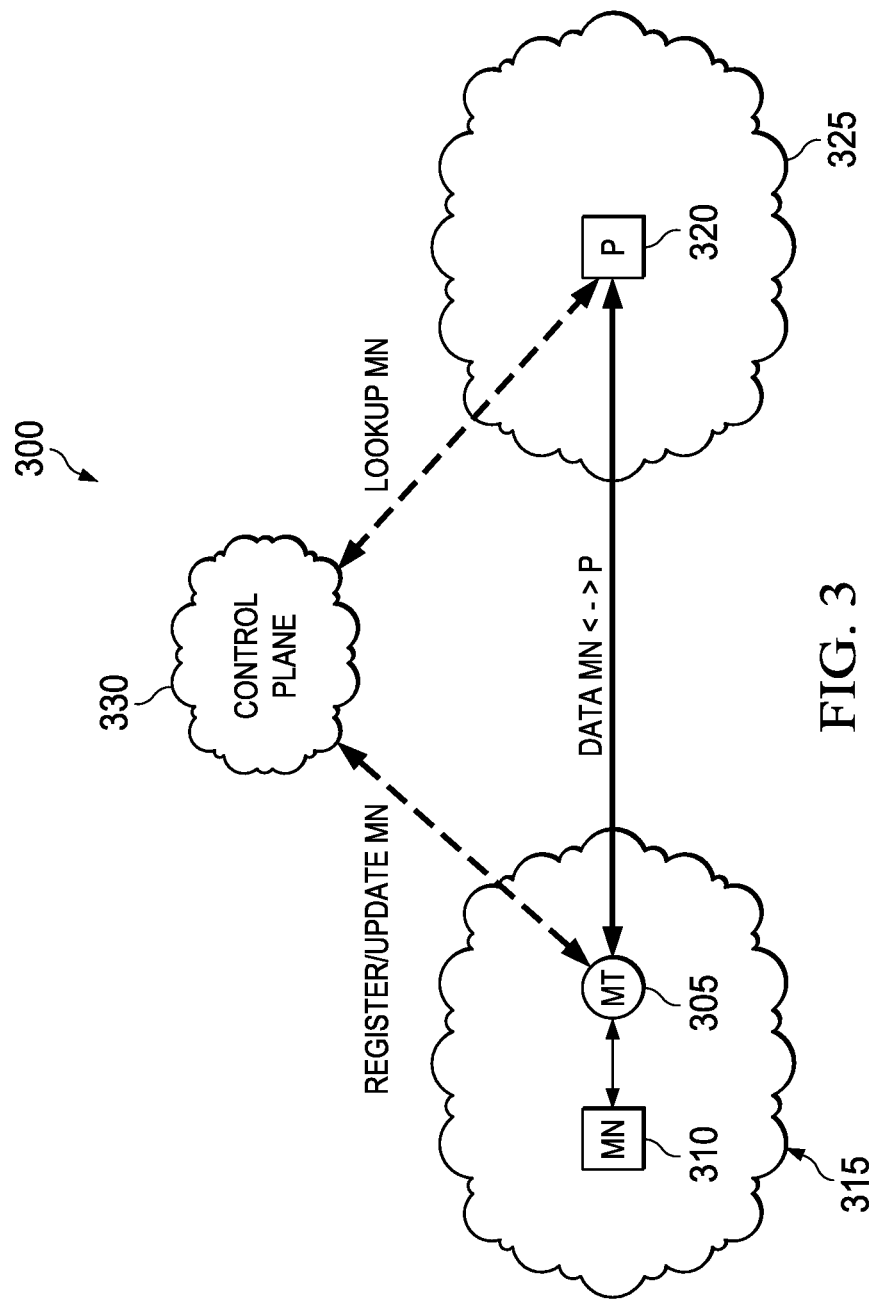
FIG. 3 is an architectural view of an example embodiment of a mobility translation system that may be associated with the network environment.

FIG. 3 is an architectural view of an example embodiment of a mobility translation system 300 that may be associated with network environment 100. In this embodiment of mobility translation system 300, a mobility translator (MT) 305 may be linked to mobile node (MN) 310 in a first mobile network 315. In general, MT 305 may be located at an exit point of mobile network 315, but may be may be collocated with a gateway device or an OBU, for example. A peer mobile node (P) 320 may operate in a second mobile network 325 having a control plane 330. Thus, MT 305 may access control plane 330 to register MN 310 and provide status updates, thereby allowing P 320 to lookup MN 310 in control plane 330. MN 310 and P 320 may communicate through MT 305.

Figure 4:
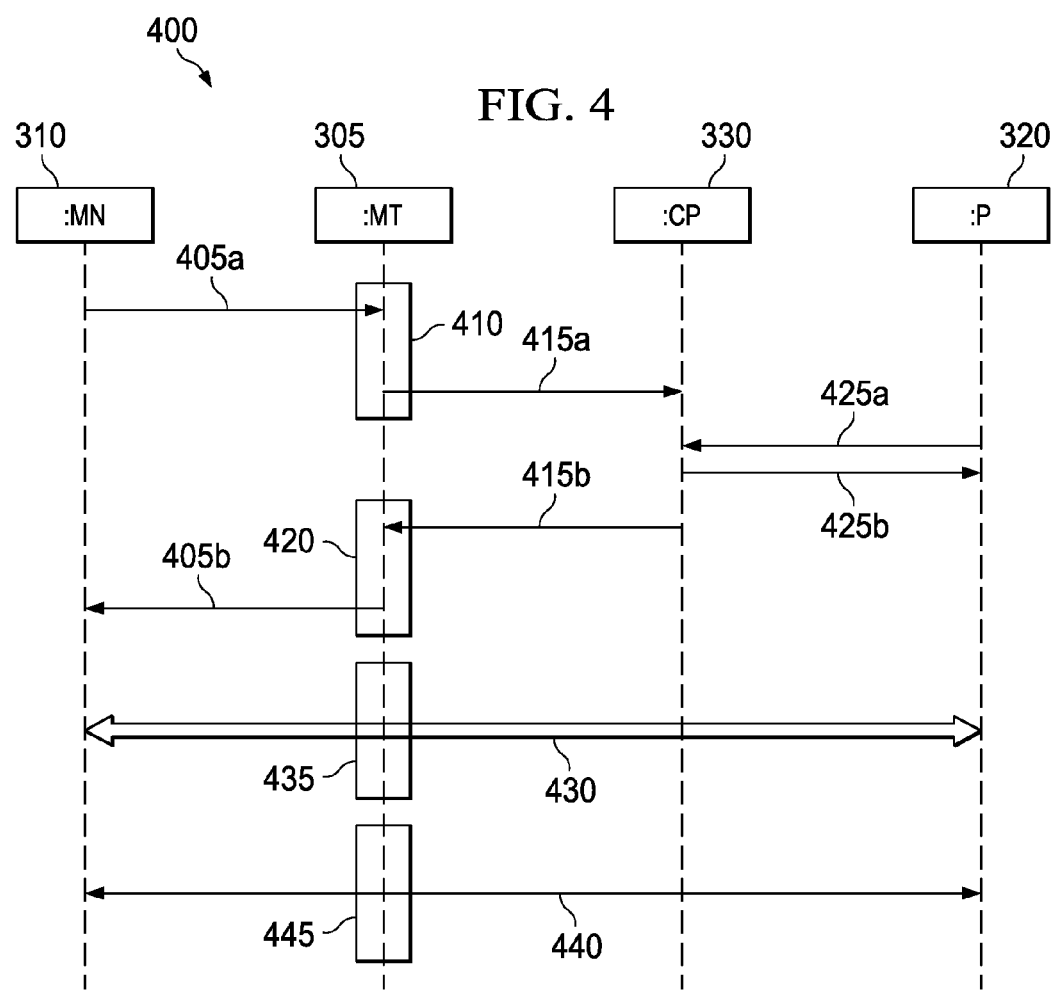
FIG. 4 is a simplified sequence diagram illustrating example operations that may be associated with one embodiment of the mobility translation system.

FIG. 4 is a simplified sequence diagram 400 illustrating example operations that may be associated with one embodiment of mobility translation system 300 in which MN 310 implements a mobility scheme m and P 320 implements a mobility scheme s. In this example embodiment, mobility translation system 300 includes MT 305, MN 310, P 320, and control plane (CP) 330 associated with P 320 and second mobile network 325.

Before discussing the details of sequence diagram 400, it should be noted that preliminary operations may be used to configure mobility translation system 300. For example, in certain embodiments, a mobility translator may identify a mobility scheme m supported by a mobile node. Mobility scheme m may be provided to a mobility translator a priori, may be inferred through packet inspection, or provided explicitly by a mobile node, for example. A set of mobility schemes N to support for a mobile node may also be determined, which can also be provided a priori or explicitly/dynamically specified by a mobile node, for example. For each mobility scheme n in the mobility set N, a mobile node's control plane information for n may be identified. Such control plane information may include, for example, control entity information, security information, etc. The mobile node may then be registered in n's control plane, and the control plane may also be updated as needed, for example if the mobile node's location information (e.g., L3 address) changes. Similarly, a peer node's mobility scheme s may be determined to facilitate communication between the peer node and a mobile node. This information can be preconfigured in a mobility translator or via a mobility lookup service, for example.

Turning again to sequence diagram 400 for illustration, communication may be initiated by either MN 310 or P 320. If MN 310 initiates communication with P 320, MN 310 can assume that P 320 uses the mobility scheme m and attempt to look up P 320 in m's control plane at 405a, using an L3 address, for example. MT 305 may intercept the lookup request and gather information about P 320 from the lookup request at 410. Using information gathered about P 320, MT 305 can retrieve control information for P 320 from CP 330 at 415a-b. MT 305 can construct a response to the lookup request at 420 and forward the response to MN 310 at 405b. Conversely, if P 320 initiates communication with MN 310, P 320 can assume that MN 310 uses the mobility scheme s and look up MN 310 in control plane 330 at 425a-b. Note that if MT 305 determines that P 320 implements the same mobility scheme as MN 320 (i.e., mobility scheme m) or vice-versa, then MT 305 can simply relay control information.

Once MN 310 or P 320 initiate communication, MT 305 can set up a data plane 430 between MN 310 and P 320 on behalf of MN 310 at 435. MN 310 and P 320 can then exchange packets via MT 305 at 440. MT 305 intercepts and translates packets at 455. Translation may include, for example, removing mobility related headers and attaching new mobility headers conforming to mobility scheme m or s, as appropriate. MT 305 can also perform control plane operations on behalf of MN 310. If MN 310's location information changes, for example, MT 305 can register the change with CP 330 as needed. Conversely, MT 305 can also process and track similar control plane updated from P 320 to MN 310.

Thus, for example, if MN 310 runs Mobile IPv6 and P 320 runs LISP-MN, MT 305 can provide mobility translation services for MN 310 such that MN 310 and P 320 can communicate. MT 305 can determine that MN 305 runs Mobile IPv6, such as by looking up MN 310 in a configuration table or inspecting packets originating or delivered to MN 310. To provide LISP-MN translation for MN 310, MT 305 can identify the LISP-MN related control plane information of MN 310. For example, MT 305 may be provisioned with a pool of endpoint identifiers (EIDs) and assign an EID from this pool to MN 310. Thus, MT 305 may also be aware of a corresponding LISP-MN map server and security credentials. MT 305 can register the LISP-MN EID assigned to MN 310 in a domain name system (DNS). The DNS may already have a record for MN 310 that maps MN 310 to its Mobile IPv6 home address and registration of another record for MN 310 (e.g., with MN 310's LISP-MN EID) may modify the DNS record structure. MT 305 can also register MN 310 with a corresponding LISP-MN map server. If location information associated with MN 310 changes, MT 305 can update the map server with new information. MT 305 may further notify MN 310 about the change in location information so that MN 310 can send a secure binding update (secured via IPSEC) to its Mobile IPv6 home agent.

MN 310 can then assume that P 320 also runs Mobile IPv6 and initiate communication with P 320. More particularly, MN 310 can attempt to look up P 310 in the DNS, but MT 305 can intercept the look up request. MT 305 may retrieve P 310's EID from the DNS and look up P 310 in the LISP-MN control plane. Using P 310's location information from the LISP-MN control plane, MT 305 can respond to the look up request of MN 310 with location information associated with P 310.

MT 305 can also perform translation services in both control plane and data plane on behalf of MN 310. For example, in certain embodiments, MT 305 can intercept data packets between MN 310 and P 320 and replace Mobile IPv6 tunnel headers or Mobile IPv6 options with corresponding LISP+UDP+IP headers on the forward direction and vice-versa on the reverse direction. MT 305 can also transmit necessary control plane updates to P 320 and process and track similar updates in the reverse direction.

Conversely, P 320 can also initiate communication with MN 310 and assume that MN 310 runs LISP-MN. P 320 can look up the EID assigned to MN 310 in the DNS and retrieve LISP-MN control plane information for MN 310. P 320 may then transmit packets to MN 310 via MT 305, while MT 305 can perform translation services in both control and data plane on behalf of MN 310.

Figure 5:
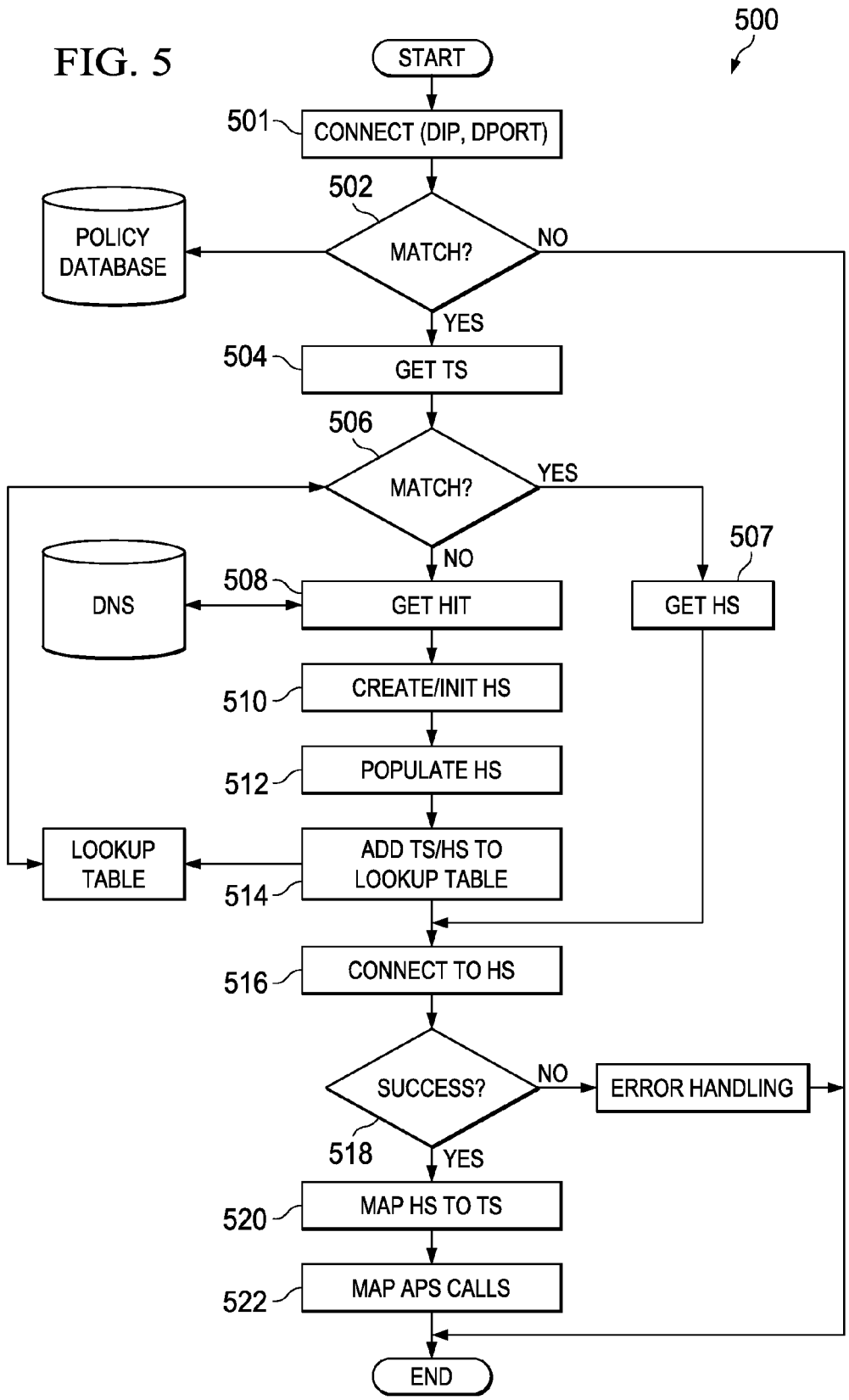
FIG. 5 is a simplified flowchart illustrating example operations of one embodiment of a pseudo-socket layer that may be associated with the network environment.

Turning now to other example embodiments, FIG. 5 is a simplified flowchart 500 illustrating potential operations of one embodiment of a PSL. In this example, a legacy TCP client-server application may be running on hosts equipped with a PSL, and both client and server hosts support a more recent protocol, such as HIP. To provide multi-homing and mobility support (e.g., via HIP) for the legacy TCP application, a PSL rule can be setup in a policy database on the client host that provides a match pattern such as "L4 Protocol=TCP, destination IP=DIP (and destination DNS name=DNAME), destination port=DPORT." A similar rule may be configured on the server host. A PSL action associated with this PSL rule may provide that a TCP connection should be replaced with a HIP association, for example.

A policy database may be dynamically configurable based on environmental (system-specific) factors, user preferences, or application-specific settings, for example. Thus, policy configurations can be used enable legacy applications to benefit from improved performance and/or improved network efficiency via optimal choice of L4 through L3 features and services.

Thus, when the TCP application attempts a connect( ) call to the destination IP and port at 501, for example, the PSL can match the call to the PSL rule at 502 and retrieve the TCP socket ID (TS) from the connect( ) call at 504. At 506, a lookup table can be searched for TS. If no match is found, then DNS can be queried at 508 to retrieve HIP information (HIT) for the destination IP/DNS name. The HIP information may also be queried and cached beforehand. For example, HIP information may be queried and cached when the rule is installed in the policy database. At 510, a HIP socket (HS) can be created and initialized. HS can be populated with information from TS and the TCP application's host HIP information at 512. A mapping between TS and HS can be stored in the lookup table at 514. A connect( ) call may then be invoked on HS at 516. A connect( ) call may also be invoked on HS at 516 if a match is found in the lookup table at 506, which implies that a corresponding HS has been previously setup, and the HS is retrieved at 507. When connect( ) on HS returns, the success or failure of the connect( ) call may be inferred at 518 and the result mapped to TS at 520. Assuming a successful connect( ) at 518, future socket API calls invoked on TS may be mapped to the corresponding calls on HS at 522. For example, a send( ) or recv( ) call on TS can be mapped to the corresponding calls on HS, relying on the lookup table for mappings.

A PSL implementation may be applied similarly to many L4 through L3 protocols and services with varying levels of granularity such that legacy applications can leverage a wide variety of L4 through L3 services to improve application performance, security, etc. Actions may result in a direct mapping of one socket to another, for example, or may result in mappings that are more complex where multiple sockets of one protocol are mapped to a single socket of another protocol. Example use cases are provided below to further illustrate a few of the potential applications of a PSL in accordance with this specification, but are not intended to be exhaustive or limiting. In general, the examples that follow assume that peer host is aware of and supports the actions, such as via a similar PSL implementation or L4 through L3 gateways/proxies.

Thus, for example, a legacy TCP application can leverage a PSL to benefit from transport layer mobility, multi-homing, and fault-tolerance by using a match pattern as described above and replacing a single TCP connection with an SCTP or HIP association. The SCTP or HIP association can leverage multiple interfaces (e.g., 3G, Wi-Fi, etc.) at the source host.

In another example, UDP-based video flows and the network can be enabled to benefit from TCP-friendly rate control (TFRC) with a match pattern such as "L4 Protocol=UDP, destination IP=DIP, destination port=DPORT." A single UDP flow can be replaced with a single DCCP connection having congestion control set to TFRC (DCCP CCID=3).

Multiple TCP connections to the same destination can also be enabled to benefit from transport layer streams. Transport streams (e.g., SCTP streams) are logical pipes within a transport connection. Each stream can have its own sequencing space and deliver data reliably and in-order, providing the same services to an application as a single TCP connection. Compared to multiple TCP connections, the different schemes can share ACK information and improve loss recovery and application response time in low bandwidth/lossy wireless connections. A match pattern in such a use case may include "L4 Protocol=TCP, destination IP=DIP, destination port=DPORT," and a single TCP connection can be mapped to a single SCTP stream, for example.

In yet another example use case, transport layer security can be enabled for UDP flows. A match pattern in such a case may include "L4 Protocol=UDP, destination IP=DIP, destination port=DPORT," and an action may be configured to replace a single UDP flow with a single DTLS flow.

Certain applications can generate data that is valid for a specific duration (e.g., live video streaming). Once the lifetime expires, the data may no longer be considered useful to an application and transmission may be wasteful. Unlike TCP's reliable data transmission service, a partial reliability service can enable transmission just during the data's lifetime, and expired data can be discarded at the transport sender. Partial reliability can be enabled via a PSL for messages from a legacy TCP application. For example, using a match pattern such as "L4 Protocol=TCP, destination IP=DIP, destination port=DPORT," a PSL can replace each TCP connection with an SCTP association and mark each application protocol data unit for partial reliability with a lifetime of 200 ms (PR-SCTP's timed-reliability feature).

Another use case may include enabling IPv6 for all TCP connections from a legacy IPv4 application. With a match pattern such as "L4 Protocol=TCP, L3 Protocol=IPv4, destination IPv4=DIP4, destination DNS name=DNAME," for example, a single TCP/IPv4 connection can be replaced with a single TCP/IPv6 connection.

Figure 6:
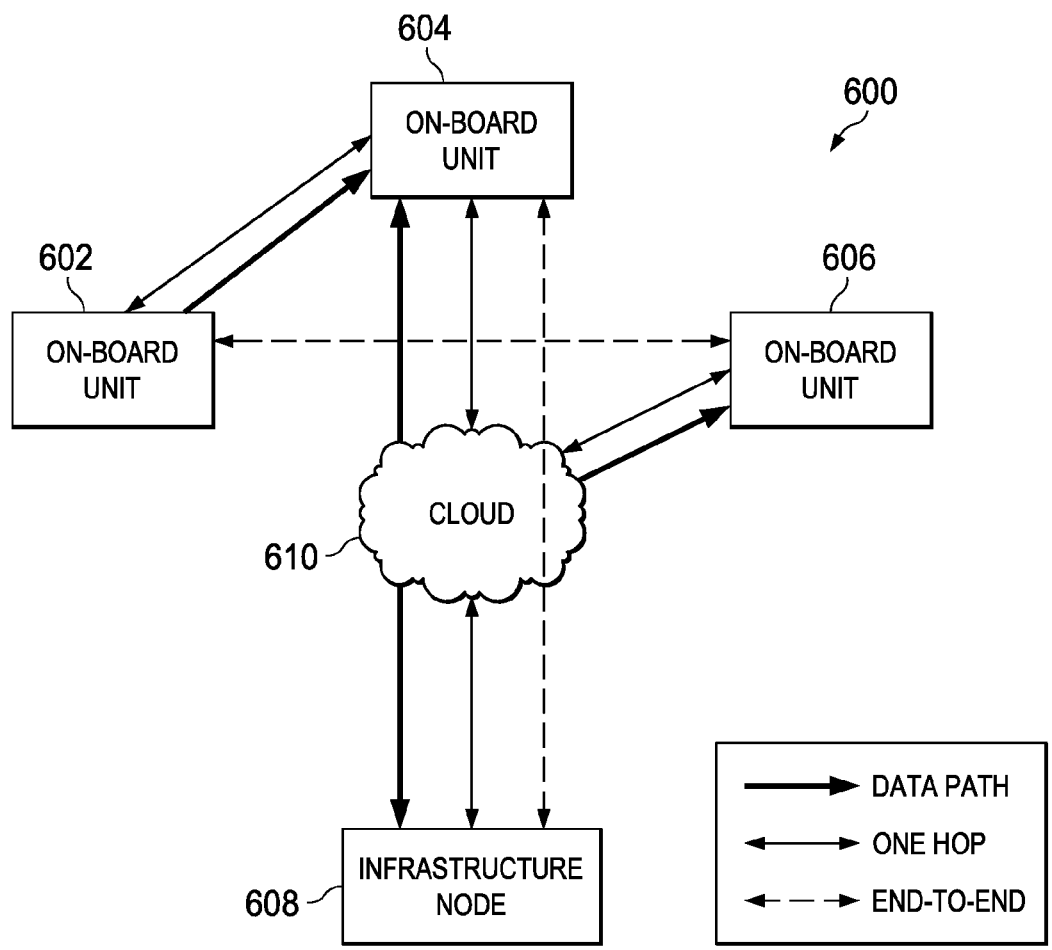
FIG. 6 is a simplified schematic diagram that illustrates interaction between nodes in one embodiment of the network environment.

FIG. 6 is a simplified schematic diagram 600 that illustrates interaction between OBUs in one embodiment of network environment 100. FIG. 6 includes a source OBU 602, a neighbor OBU 604, and a destination OBU 606, all of which may communicate with each other and an infrastructure node 608 (e.g., a controller) via network links, such as any suitable wireless link (e.g., cellular, satellite, IEEE 802.11x, etc.) and a network cloud 610 (e.g., the Internet). Other network links may include wireless technologies enabling direct wireless communication between OBUs 602-604 (e.g., DSRC, WiFi, etc.) To facilitate operations, source OBU 602 may interact with destination OBU 606 so that both know the coding scheme(s) used for communication. Usually, data is transmitted over multiple hops to a final destination, where a 'hop' refers to one point-to-point communication link between nodes. Nodes in one-hop range, such as neighbor OBU 604 or infrastructure node 608, can negotiate coding schemes for one hop, while source nodes and destination nodes can negotiate end-to-end coding schemes.

Figure 7:
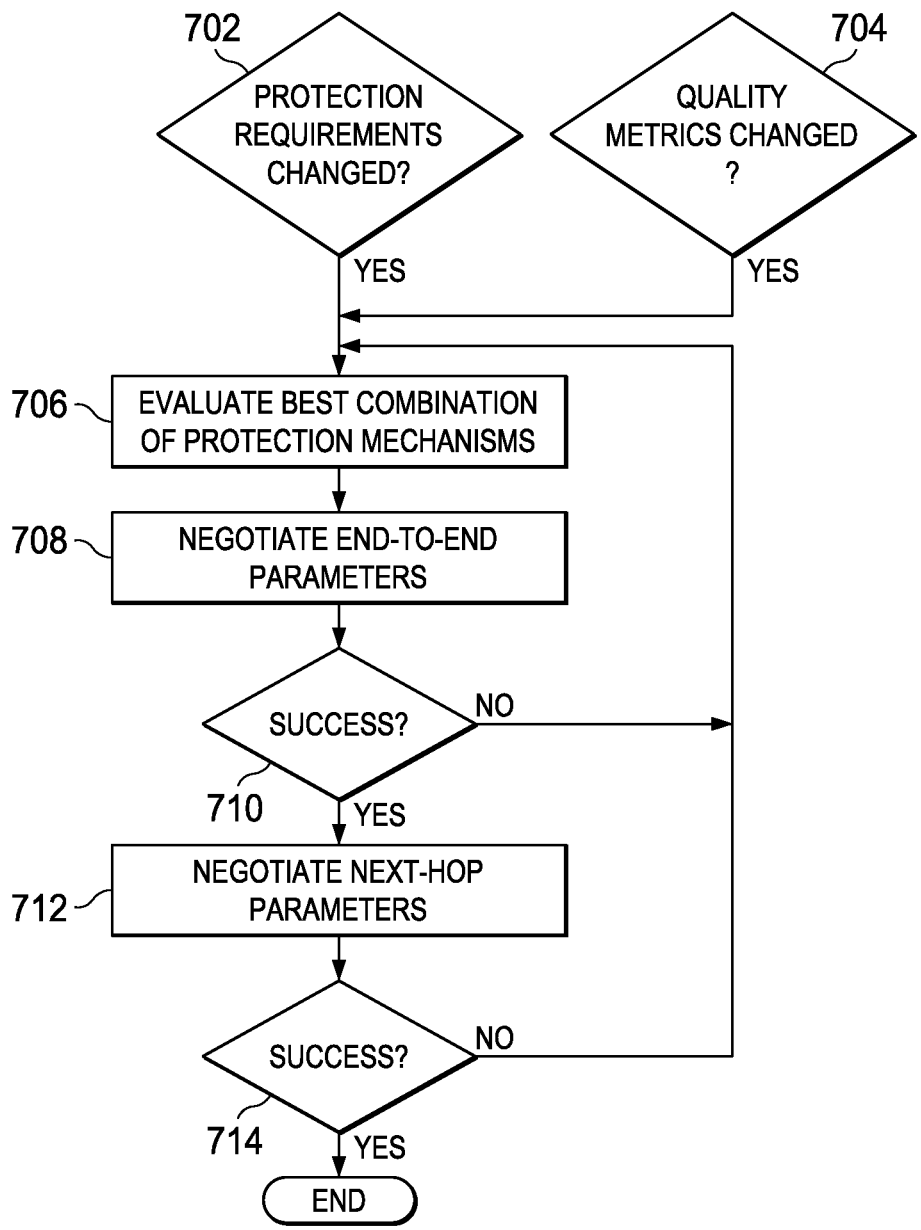
FIG. 7 is a simplified flowchart that illustrates example operations that may be associated with one embodiment of the network environment.

FIG. 7 is a simplified flowchart 700 that illustrates example operations that may be associated with one embodiment of network environment 100, such as the embodiment illustrated in FIG. 6. In one particular embodiment, such example operations may be carried out by an APM in an OBU, such as source OBU 602.

If protection requirements change at 702 or quality metrics change at 704, combinations of protection mechanisms can be evaluated at 706. End-to-end parameters can be negotiated at 708. For instance, end-to-end negotiation can occur between source and destination nodes with a focus on the message and transport/network layers. Information on network topology and other supplementary information may be used to determine redundant paths at the transport/network layers, for example. Topology-based coding schemes at the message layer, such as fountain codes, and other methods of improving probability of data delivery to a destination node may also be negotiated. End-to-end negotiation may include agreement between neighboring nodes on message layer parameters, such as the type of source coding, UEP, and network coding, and transport/network layer parameters, such as the degree of path diversity and network coding, based on parameters such as tolerable delay or tolerable error rate.

If end-to-end negotiations are successful at 710, next-hop parameters can be negotiated at 712. For example, neighboring OBUs can negotiate parameters and focus on the PHY and Link layer coding scheme to improve data delivery probability at each hop from a source node to a destination node. Since channel conditions and potentially protocol/modulation of the PHY and Link layer can change at every hop, this negotiation has to occur between all neighboring nodes in the path between the source and destination. One-hop negotiation may include, for example, agreement between neighboring nodes on PHY layer parameters such as modulation and coding schemes, scrambler patters, bit, interleaving schemes, transmitted power, etc., and Link layer parameters, such as type of FEC scheme and ARQ parameters, which may include type (e.g., conventional or hybrid) or maximum number of re-transmissions, for example.

If any negotiations are unsuccessful at 710 or 714, the combination of protection mechanisms may be evaluated again at 706. However, if negotiations are successful at 710 and 714, the flow may end.

An OBU may have multiple wireless interfaces (e.g., 3G, 4G, WiFi, etc.) with vastly different performance characteristics. Multiple layers of coding can be applied to maximize performance jointly across different links in accordance with this specification. For example, simply splitting a video flow across 3G and WiFi links can suffer delay dispersion, necessitating a large reordering buffer to deal with path delay and throughput disparity between the two links, which in turn can significantly increase end-to-end application delay. However, performance can be improved by applying multiple layers of coding, such as network coding combined with PHY layer coding, which may be applied as traffic passes through nodes such as a controller/OBU pair. Moreover, selected coding schemes across multiple layers can be adapted to interface changes as a vehicle moves and an OBU connects to different networks. An optimal combination of coding and data protection schemes across different network layers, wireless networks, and different applications can be dynamically selected. An OBU may be particularly suited to perform such a selection since it can be the ingress and egress point for all in-vehicle communication devices.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that network environment 100 (and its teachings) are readily scalable and can accommodate a large number of components, as well as more complicated/sophisticated arrangements and configurations. Accordingly, the examples provided should not limit the scope or inhibit the broad teachings of network environment 100 as potentially applied to a myriad of other architectures. Additionally, although described with reference to particular scenarios, where a module is provided within the network elements, these modules can be provided externally, or consolidated and/or combined in any suitable fashion. In certain instances, a module may be provided in a single proprietary unit.

It is also important to note that the steps in the appended diagrams illustrate only some of the possible signaling scenarios and patterns that may be executed by, or within, network environment 100. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network environment 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    intercepting a lookup request from a first mobile node associated with a first mobile scheme for a first mobile network;
    retrieving control information for a second mobile node associated with a second mobile scheme for a second mobile network based on the lookup request, wherein the control information is retrieved from a control plane in which the first mobile node and the second mobile node are registered;
    forwarding the control information to the first mobile node;
    establishing a data plane between the first mobile node and the second mobile node;
    intercepting packets exchanged between the first mobile node and the second mobile node;
    dynamically selecting and applying a combination of data protection schemes for a message layer, a Layer 4 (L4) transport layer, a network layer, a link layer and a physical layer;
    negotiating end-to-end parameters between the first mobile node and the second mobile node using the dynamically selected data protection schemes;
    translating packets from the first mobile scheme to the second mobile scheme to leverage one or more capabilities for the second mobile scheme that are unavailable for the first mobile scheme, wherein at least one of the first mobile node and the second mobile node is an on-board unit for a vehicle and wherein at least one of the first mobile scheme and the second mobile scheme is associated with a Layer 4 (L4) transport protocol; and
    tracking location information for at least one of the first mobile node and the second mobile node based on registration updates in the control plane for at least one of the first mobile node and the second mobile node.

2. The method of claim 1, further comprising:
    registering the first mobile node in a control plane of the second mobile node.

3. The method of claim 1, further comprising:
    registering the first mobile node in a control plane of the second mobile node; and
    performing control plane functions on behalf of the first mobile node in the control plane of the second mobile node.

4. The method of claim 1, wherein translating packets comprises removing a first mobility header associated with the first mobile scheme and attaching a second mobility header conforming to the second mobile scheme.

5. The method of claim 1, wherein the first mobile scheme is associated with a first protocol and the second mobile scheme is associated with a second protocol, the method further comprising:
    matching parameters associated with the first protocol to a match pattern;
    applying an action set to modify the packets to conform to a second protocol; and
    exchanging the packets between the first mobile node and the second mobile node using the second protocol.

6. The method of claim 5, wherein the action set maps a first socket associated with the first protocol to a second socket associated with the second protocol.

7. The method of claim 5, wherein the action set maps a plurality of sockets associated with the first protocol to a socket associated with the second protocol.

8. The method of claim 5, wherein the match pattern includes a network layer parameter.

9. The method of claim 5, wherein the match pattern includes a transport layer parameter.

10. The method of claim 5, wherein:
    the first protocol is a transport control protocol;
    the second protocol is a host identity protocol; and
    the action set comprises replacing a connection associated with the transport control protocol with a host identity control protocol association.

11. The method of claim 1, further comprising:

negotiating next-hop parameters using the dynamically selected data protection schemes.

12. Logic encoded in one or more non-transitory media that includes code for execution and when executed by one or more processors is operable to perform operations comprising:
- intercepting a lookup request from a first mobile node associated with a first mobile scheme for a first mobile network;
- retrieving control information for a second mobile node associated with a second mobile scheme for a second mobile network based on the lookup request, wherein the control information is retrieved from a control plane in which the first mobile node and the second mobile node are registered;
- forwarding the control information to the first mobile node;
- establishing a data plane between the first mobile node and the second mobile node;
- intercepting packets exchanged between the first mobile node and the second mobile node;
- dynamically selecting and applying a combination of data protection schemes for a message layer, a Layer 4 (L4) transport layer, a network layer, a link layer and a physical layer;
- negotiating end-to-end parameters between the first mobile node and the second mobile node using the dynamically selected data protection schemes;
- translating packets from the first mobile scheme to the second mobile scheme to leverage one or more capabilities for the second mobile scheme that are unavailable for the first mobile scheme, wherein at least one of the first mobile node and the second mobile node is an on-board unit for a vehicle and wherein at least one of the first mobile scheme and the second mobile scheme is associated with a Layer 4 (L4) transport protocol; and
- tracking location information for at least one of the first mobile node and the second mobile node based on registration updates in the control plane for at least one of the first mobile node and the second mobile node.

13. The logic of claim 12, wherein the operations further comprise:
- registering the first mobile node in a control plane of the second mobile node.

14. The logic of claim 12, wherein the operations further comprise:
- registering the first mobile node in a control plane of the second mobile node; and
- performing control plane functions on behalf of the first mobile node in the control plane of the second mobile node.

15. An apparatus, comprising:
- a mobility translator module; and
- one or more processors operable to execute instructions associated with the mobility translator module such that the apparatus is configured for:
  - intercepting a lookup request from a first mobile node associated with a first mobile scheme for a first mobile network;
  - retrieving control information for a second mobile node associated with a second mobile scheme for a second mobile network based on the lookup request, wherein the control information is retrieved from a control plane in which the first mobile node and the second mobile node are registered;
  - forwarding the control information to the first mobile node;
  - establishing a data plane between the first mobile node and the second mobile node;
  - intercepting packets exchanged between the first mobile node and the second mobile node;
  - dynamically selecting and applying a combination of data protection schemes for a message layer, a Layer 4 (L4) transport layer, a network layer, a link layer and a physical layer;
  - negotiating end-to-end parameters between the first mobile node and the second mobile node using the dynamically selected data protection schemes;
  - translating packets from the first mobile scheme to the second mobile scheme to leverage one or more capabilities for the second mobile scheme that are unavailable for the first mobile scheme, wherein at least one of the first mobile node and the second mobile node is an on-board unit for a vehicle and wherein at least one of the first mobile scheme and the second mobile scheme is associated with a Layer 4 (L4) transport protocol; and
  - tracking location information for at least one of the first mobile node and the second mobile node based on registration updates in the control plane for at least one of the first mobile node and the second mobile node.

16. The apparatus of claim 15, wherein the apparatus is further configured for:
- registering the first mobile node in a control plane of the second mobile node.

17. The apparatus of claim 15, wherein the apparatus is further configured for:
- registering the first mobile node in a control plane of the second mobile node; and
- performing control plane functions on behalf of the first mobile node in the control plane of the second mobile node.

18. The apparatus of claim 15, wherein translating packets comprises removing a first mobility header associated with the first mobile scheme and attaching a second mobility header conforming to the second mobile scheme.

19. The apparatus of claim 15, wherein the first mobile scheme is associated with a first protocol and the second mobile scheme is associated with a second protocol, wherein the apparatus is further configured for:
- matching parameters associated with the first protocol to a match pattern;
- applying an action set to modify the packets to conform to a second protocol for a second mobile network; and
- exchanging the packets between the first mobile node and the second mobile node using the second protocol.

20. The apparatus of claim 19, wherein the action set maps a first socket associated with the first protocol to a second socket associated with the second protocol.

* * * * *